United States Patent
Rubik et al.

(10) Patent No.: US 12,170,700 B2
(45) Date of Patent: Dec. 17, 2024

(54) MULTICASTING DATA OF DATA STREAMS

(71) Applicant: TRADING TECHNOLOGIES INTERNATIONAL, INC., Chicago, IL (US)

(72) Inventors: Scott D. Rubik, Plainfield, IL (US); Bharat Mittal, Schaumburg, IL (US); Rajan Marwaha, Woking (GB)

(73) Assignee: Trading Technologies International, Inc., Chicago, IL (US)

( * ) Notice: Subject to any disclaimer, the term of this patent is extended or adjusted under 35 U.S.C. 154(b) by 0 days.

(21) Appl. No.: 18/084,856

(22) Filed: Dec. 20, 2022

(65) Prior Publication Data

US 2024/0205280 A1    Jun. 20, 2024

(51) Int. Cl.
*H04L 65/611*    (2022.01)
*G06Q 40/04*    (2012.01)
*H04L 67/146*    (2022.01)

(52) U.S. Cl.
CPC .......... *H04L 65/611* (2022.05); *H04L 67/146* (2013.01); *G06Q 40/04* (2013.01)

(58) Field of Classification Search
CPC ............................. H04L 65/611; G06Q 40/04
See application file for complete search history.

(56) References Cited

U.S. PATENT DOCUMENTS

| | | | |
|---|---|---|---|
| 6,349,340 B1* | 2/2002 | Dyer | H04L 12/1859 709/200 |
| 2007/0258466 A1* | 11/2007 | Kakani | H04L 1/1614 370/395.53 |
| 2011/0044226 A1* | 2/2011 | Song | H04W 72/30 370/312 |
| 2011/0176545 A1 | 7/2011 | Boers et al. | |
| 2014/0164202 A1* | 6/2014 | Singer | G06Q 40/04 705/37 |
| 2023/0127464 A1* | 4/2023 | Xiong | H04L 12/4633 709/238 |

OTHER PUBLICATIONS

Zhong Zeng, "Data Transmission Technology and Neural Network System", Jul. 2, 2020, WO 2020/135545 A1 (English Translation), pp. 1-42 (Year: 2020).*
International Search Report and Written Opinion for International Application No. PCT/US2023/084851, mailed Apr. 8, 2024.

* cited by examiner

*Primary Examiner* — Jonathan A Bui
(74) *Attorney, Agent, or Firm* — McDonnell Boehnen Hulbert & Berghoff LLP

(57) ABSTRACT

Techniques for multicasting data to multiple clients are described. Each client stores an identifier indicating a data stream associated with, for example intended for, the client. A server receives the data streams, determines the identifier for each received data stream, transmits a mapping between the identifiers and respective multicast streams to the clients, and multicasts data of the received data streams in accordance with the mapping. By transmitting the mapping to the clients, and multicasting data of the received data streams in accordance with the mapping, each client may obtain data of the particular data stream with which they are associated.

14 Claims, 9 Drawing Sheets

| Identifier | Multicast address | |
|---|---|---|
| | IP address | Port number |
| 28454930 | 239.225.225.X | P |
| 74504482 | 239.225.225.Y | Q |
| ... | ... | ... |

302

MULTICASTING DATA OF DATA STREAMS

BACKGROUND

In computer networking, multicast refers to a communication technique where data transmission is addressed to a group of receivers on a network. For example, Internet Protocol (IP) multicast is a multicast communication technique utilizing the IP infrastructure of a network. Multicast techniques can provide for scalable one-to-many communications, as data need only be transmitted once, even if that data is to be delivered to a large number of receivers. Multicast techniques can therefore be useful in systems where multiple clients need the same data from a data source.

In some situations, different clients may need different data from a data source, or different data from different data sources. Unicast techniques allow data sources to communicate individually with different clients on a network. However, unicast techniques may not be efficient where there are multiple, for example hundreds or thousands, of clients.

BRIEF DESCRIPTION OF THE DRAWINGS

Certain embodiments are disclosed with reference to the following drawings.

DETAILED DESCRIPTION

Figure 1:
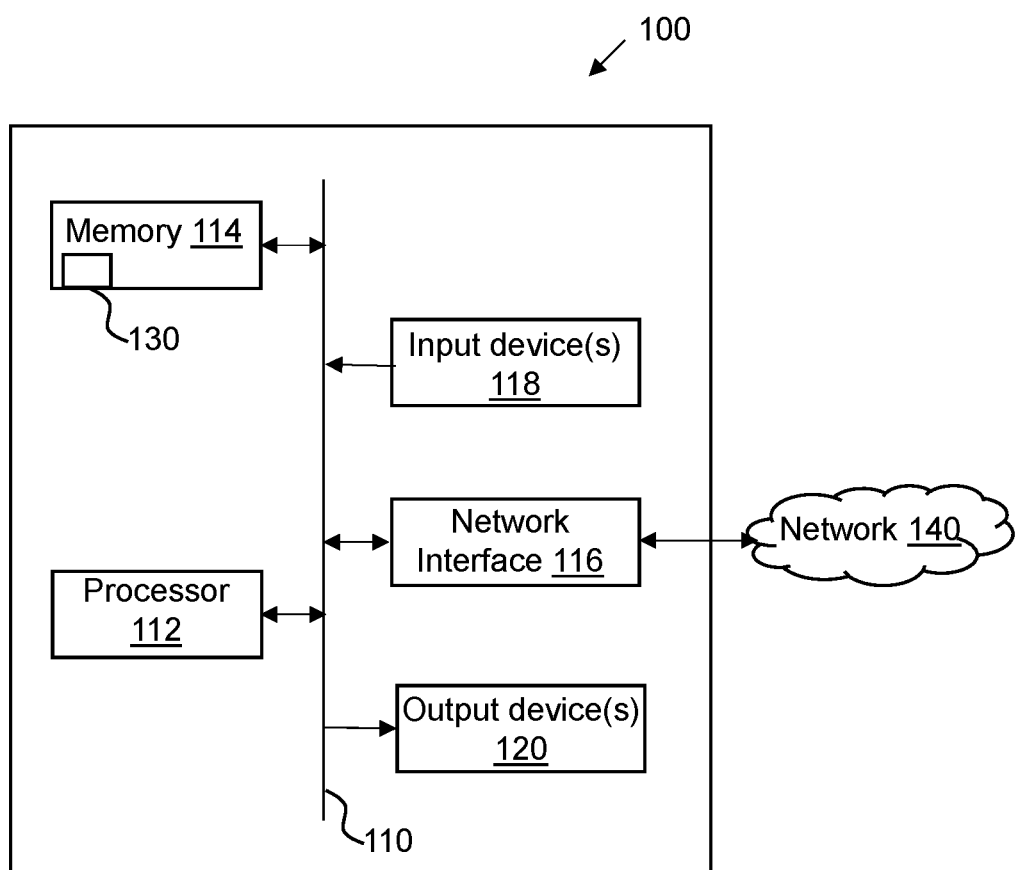
FIG. 1 illustrates a block diagram of an example computing device which may be used to implement certain embodiments.

The disclosed embodiments generally relate to multicast communications, and in particular to systems and methods where a server system multicasts data to multiple clients. Multicast techniques are useful in situations where multiple clients all need the same data from the server system. Multicast techniques are scalable with respect to the number of clients, as the data need only be transmitted once, even if that data is to be delivered to a large number of clients. For these reasons, or otherwise, a server system may be configured to multicast data to multiple clients, for example thousands or hundreds of thousands or more clients. However, a situation may occur where different clients need different data from the server system. For example, this may occur when the server system receives multiple different data streams each associated with and intended for respective different clients. A unicast technique would allow the server system to communicate individually with the different clients, and hence allow different clients to obtain the different data streams from the server system. However, unicast techniques are not scalable with respect to the number of clients as data needs to be transmitted by the server system to each client individually. Hence employing a unicast technique may be inefficient, and in cases where there are many clients, such as tens or hundreds of thousands or more clients, employing a unicast technique may not be feasible. In such situations it would be desirable to adapt a multicast system, which is efficient and scalable with respect to the number of clients, to also accommodate different clients obtaining different data.

I. BRIEF DESCRIPTION OF CERTAIN EMBODIMENTS

Certain embodiments provide a server system including a memory and at least one processor configured to multicast data to a plurality of clients. Each client may include software running on a computing device. In examples, there may be one client per device. More generally, the plurality of clients may run on one or more devices. Each client stores an identifier indicating a data stream associated with, for example intended for, the client. For example, an ID server may generate an identifier for each of a plurality of data streams, and for each client, provide the client with the identifier indicating the data stream with which the client is associated. The ID server may also provide the generated identifiers to the server system. The at least one processor of the server system is configured to receive the data streams, for example from a data source, and determine the identifier for each received data stream. The at least one processor of the server system is configured to transmit, to the plurality of clients, a mapping between each identifier and a respective multicast stream, and multicast data of the received data streams in accordance with the mapping. These features allow that multicast, which is efficient and scalable, can be used to allow different clients to obtain different data streams. Specifically, by the server system transmitting a mapping between the identifiers and respective multicast streams, and multicasting data of the received data streams in accordance with the mapping, each client is able to obtain data of the particular data stream with which they are associated (for example, the data stream that is relevant to and intended for them). Targeted and scalable data transmission may therefore be provided.

In certain embodiments, each client receives the mapping, matches the identifier stored at the client with an identifier in the received mapping, and obtains data of the multicast stream mapped to the matched identifier. Accordingly, each client obtains data of the particular data stream with which they are associated (for example, the data stream that is relevant to and intended for them). Accordingly, different clients are able to obtain different data from the server system using multicast.

In certain embodiments, the mapping transmitted to the plurality of clients includes a mapping between each identifier and a respective different multicast address, and the at least one processor of the server system is configured to multicast data of each data stream using the respective multicast address mapped to the identifier for the data stream. This may allow that data from each data stream is only transmitted to the client or devices associated with the data stream. This may allow for efficient communications (for example, as compared to transmitting data of all of the received streams to all of the clients). Efficient targeted and scalable communication may therefore be provided. In these embodiments, each client may configure a communications interface to receive data transmitted with a destination address corresponding to the multicast address mapped to the identifier matched to the stored identifier. Accordingly, each client is able to obtain, from a multicast stream, data of the particular data stream with which they are associated.

In certain embodiments, the at least one processor of the server system is configured to broadcast the mapping over a network to which each of the plurality of clients are connected. This may help ensure that all of the clients receive the mapping. This allows that the mapping is provided in an efficient and scalable way (for example, as compared to providing the mapping to each client individually, for example using unicast messaging).

In certain embodiments, the at least one processor of the server system is configured to, for each data stream, generate a multicast stream including the identifier for the data stream and data of the data stream, thereby to encode the mapping into each multicast stream. The at least one processor of the server system is configured to multicast each of the generated multicast streams to the plurality of clients. Since the mapping is encoded into the multicast streams themselves, there is no need for separate messaging to communicate the mapping to the clients. Efficient scalable communication may therefore be provided. Further, since the mapping is encoded into the multicast streams, each multicast stream can use the same multicast address. Efficient and scalable use of multicast address allocation may therefore be provided. Moreover, since each multicast stream can use the same multicast address, separate steps associated with different clients requesting to join separate multicast addresses need not be carried out. Efficient scalable communication may therefore be provided. In these embodiments, each client may receive the plurality of multicast streams, and obtain data from a multicast stream, of the plurality of received multicast streams, that includes the identifier matched to the stored identifier. Accordingly, each client is able to obtain, from a multicast stream, data of the particular data stream with which they are associated.

In certain embodiments, each multicast stream includes one or more multicast packets each including a header and a payload, and for each of the generated multicast streams, the header includes the identifier for the received data stream and the payload may include data of the received data stream. Including the identifier in a header of the multicast packet allows for clients (for example, application programming interfaces thereof) to identify, in an efficient manner, which multicast packets include data from the data stream with which they are associated. For example, parsing a header for the identifier may be more efficient than parsing the payload. Efficient scalable communication may therefore be provided.

In certain embodiments, each of the generated multicast streams are multicast using the same multicast address. Efficient and scalable use of multicast address allocation may therefore be provided. Moreover, this may allow that separate steps associated with different clients requesting to join separate multicast addresses need not be carried out. Efficient scalable communication may therefore be provided.

In certain embodiments, the at least one processor is configured to: normalize the data of each of the plurality of the received streams that is to be multicast. For example, the data may be translated into a format that will be understood by the clients, for example APIs of the clients. This allows for centralized normalization, which may be more efficient that, for example, each client normalizing or translating received data locally.

In certain embodiments, the at least one processor is configured to: receive the plurality of data streams over a respective plurality of different connections, and, for each of the received data streams, the identifier for the received data stream is determined based on the connection over which the data stream is received. This may help ensure there is a one-to-one mapping between the connections over which the respective data streams are received, and the multicast streams that are multicast. This may help allow for simplified processing of the received data streams into multicast streams. For example, this may allow a data stream received on a particular connection can be used to provide the data for a particular multicast stream. This may be more efficient than having to combine multiple data streams onto one multicast stream. Further, this may allow for parallelization of the processing for different received data streams and their respective different multicast streams. Efficient and/or fast processing may therefore be provided.

In certain embodiments, the at least one processor is configured to: receive the identifiers each in association with respective connection information for establishing a connection over which a respective one of the data streams is received; and for each of the plurality of received data streams, determine the identifier associated with the connection information of the connection over which the data stream is received as the identifier for the data stream. This may provide an efficient way for the server system to determine the identifier for each the data streams. For example, the server system can associate the identifier with the connection over which a data stream is received and determines that identifier for any data stream received on that connection. This may more efficient than, for example, requiring the server system to parse the data stream in order to determine the identifier for the data stream. Efficient processing of the data streams may therefore be provided.

In certain embodiments, each data stream is associated with a particular client, and the server system includes an ID server configured to: obtain the connection information for each client; associate the connection information for each different client with a different one of the identifiers; provide, to the at least one processor, for each client, the identifier in association with the connection information for the client; and provide, to each client, the identifier associated with the connection information for the client. This provides an efficient way for both the server system and the clients to be provided with the identifier. The ID server being responsible for the associations and their delivery may allow for the communication from the server system to the clients to be kept as multicast or broadcast, and hence scalable.

In certain embodiments, the at least one processor is configured to: for each of the plurality of data streams: receive connection information for establishing a connection to a data source from which the data stream is to be received; establish, using the connection information, the connection; and receive the data stream over the connection. This may help allow the server system to receive data streams behalf of the clients. This may allow the data of the data streams to be provided to the clients by the server system, for example as part of a platform provided by the server system. For example, the data of the data streams may be provided alongside other data that the server system multicasts to all of the clients as part of the platform. Accordingly, this may allow for the data source to be integrated into the platform provided by the server system.

In certain embodiments, each data stream is associated with a particular client, and, for each data stream, the connection information includes log-in information for the client associated with the data stream to access the data source. This may allow for the data stream to include client specific data, for example data that has been set up in an account of the data source to be delivered for that particular account. Efficient messaging tailored to individual clients may therefore be provided.

In certain embodiments, the server system implements a price server of an electronic trading system. The main role of a price server is to deliver the same data (for example, the same market data) to many different clients. Price servers may therefore use multicast in order to deliver this data in an efficient and scalable way. Implementing the server system in a price server may allow for a price server that not only multicasts the same data to multiple clients, but also multicasts data in a way that allows different clients to obtain data from different data streams.

In certain embodiments, the server system includes a data source configured to provide the plurality of data streams to the at least one processor, and the plurality of different data streams may include price data provided by respective different liquidity providers or respective different combinations of liquidity providers. This is an example scenario in which different clients (or users thereof) may require different data streams. For example, each client (or a user thereof) may have a pre-existing relationship with a particular provider or combination of providers, and hence may wish to receive data from that particular provider or particular combination of providers. The particular provider or combination of providers may be different for different clients (or users thereof). Accordingly, it is useful to be able to allow each client to obtain data from the data stream associated with them.

Certain embodiments provide a server system including a memory and at least one processor configured to multicast data to a plurality of clients, each client storing an identifier indicating a data stream associated with the client. The at least one processor is further configured to: receive a plurality of the data streams, each of the data streams including data; determine the identifier for each of the plurality of received data streams; generate a mapping between each identifier and a respective different multicast address; broadcast the mapping to the plurality of clients; for each received data stream, multicast data of the received data stream using the multicast address mapped to the identifier determined for the received data stream. This may allow that data from each data stream is only transmitted to the client associated with the data stream. This may allow for efficient communications (for example, as compared to transmitting data of all of the received streams to all of the clients). Efficient targeted and scalable communication may therefore be provided.

Certain embodiments provide a server system including a memory and at least one processor configured to multicast data to a plurality of clients, each client storing an identifier indicating a data stream associated with the client. The at least one processor is further configured to: receive a plurality of the data streams, each of the data streams including data; determine the identifier for each of the plurality of received data streams; for each of the received data streams, generate a multicast stream including the identifier for the received data stream and data of the received data stream; and multicast the generated multicast streams to the plurality of clients. Since the mapping is encoded into the multicast streams themselves, there is no need for separate messaging to communicate the mapping to the clients. Efficient scalable communication may therefore be provided. Further, since the mapping is encoded into the multicast streams, each multicast stream can use the same multicast address. Efficient and scalable use of multicast address allocation may therefore be provided. Moreover, since each multicast stream can use the same multicast address, separate steps associated with different clients requesting to join separate multicast addresses need not be carried out. Efficient scalable communication may therefore be provided.

Certain embodiments provide a client system including a memory storing an identifier indicating a data stream associated with a client of the client system and at least one processor. The at least one processor is configured to: receive, from a server system, a mapping between a plurality of identifiers and a respective plurality of multicast streams; match the stored identifier with an identifier in the mapping; and obtain data of the multicast stream mapped to the matched identifier in the mapping. This allows the client to obtain data, from a multicast stream, that is associated with, for example intended for, the client.

In certain embodiments, the mapping includes a mapping between the plurality of identifiers and a respective plurality of different multicast addresses, and the at least one processor of the client system is further configured to: configure a communications interface of the client system to receive data transmitted with a destination address corresponding to the multicast address mapped to the matched identifier in the mapping. This may allow that the client only receives their associated multicast stream. This may be more efficient than, for example, each client receiving multiple multicast streams and determining which multicast stream is associated with the client system.

In certain embodiments, the mapping is provided by including each identifier in a respective different one of a plurality of multicast streams, and the at least one processor of the client system is further configured to: receive the plurality of multicast streams; and obtain data from a multicast stream, of the plurality of multicast streams, that includes the identifier matched to the stored identifier. Since the mapping is encoded into the multicast streams themselves, there is no need for separate messaging to communicate the mapping to the clients. Efficient scalable communication may therefore be provided. Further, since the mapping is encoded into the multicast streams, each multicast stream can use the same multicast address. This may allow that each client can be configured, for example preconfigured, to receive data with a destination address having a generic multicast address common to all of the clients. Efficient and scalable use of multicast address allocation may therefore be provided. Moreover, separate steps associated with different clients requesting to join separate multicast addresses need not be carried out. Efficient scalable communication may therefore be provided.

Certain embodiments provide a method including multicasting data to a plurality of clients. Each client stores an identifier indicating a data stream associated with the client. The method includes, by a server system: receiving a plurality of the data streams, each of the data streams including data; determining the identifier for each of the plurality of received data streams; transmitting, to the plurality of clients, a mapping between each identifier and a respective multicast stream; and multicasting data of the plurality of received data streams in accordance with the mapping. As mentioned above, by this method, targeted and scalable data transmission may be provided.

Certain embodiments provide a tangible computer readable medium including instructions which, when executed, cause at least one processor of a server system to perform functions. The at least one processor is configured to multicast data to a plurality of clients, each client storing an identifier indicating a data stream associated with the client. The functions include at least: receiving a plurality of the data streams, each of the data streams including data; determining the identifier for each of the plurality of received data streams; transmitting, to the plurality of clients, a mapping between each identifier and a respective multicast stream; and multicasting data of the plurality of received data streams in accordance with the mapping. As mentioned above, by this method, targeted and scalable data transmission may be provided.

II. EXAMPLE COMPUTING DEVICE

FIG. 1 illustrates a block diagram of an example computing device 100. The computing device 100 may be used to implement certain embodiments described herein. In other examples, other computing devices may be used. The computing device 100 includes a communication bus 110, a processor 112, a memory 114, a network interface 116, an input device 118, and an output device 120. The processor 112, memory 114, network interface 116, input device 118 and output device 120 are coupled to the communication bus 110. The computing device 100 is connected to an external network 140, such as a local area network (LAN) or a wide area network (WAN), like the Internet. The computing device is connected to the external network 140 via the network interface 116. The computing device 100 may include additional, different, or fewer components. For example, multiple communication buses (or other kinds of component interconnects), multiple processors, multiple memory devices, multiple interfaces, multiple input devices, multiple output devices, or any combination thereof, may be provided. As another example, the computing device 100 may not include an input device 118 or output device 120. As another example, one or more components of the computing device 100 may be combined into a single physical element, such as a field programmable gate array (FPGA) or a system-on-a-chip (SoC).

The communication bus 110 may include a channel, electrical or optical network, circuit, switch, fabric, or other mechanism for communicating data between components in the computing device 100. The communication bus 110 may be communicatively coupled with and transfer data between any of the components of the computing device 100.

The processor 112 may be any suitable processor, processing unit, or microprocessor. The processor 112 may include one or more general processors, digital signal processors, application specific integrated circuits, FPGAs, analog circuits, digital circuits, programmed processors, and/or combinations thereof, for example. The processor 112 may be a multi-core processor, which may include multiple processing cores of the same or different type. The processor 112 may be a single device or a combination of devices, such as one or more devices associated with a network or distributed processing system. The processor 112 may support various processing strategies, such as multiprocessing, multi-tasking, parallel processing, and/or remote processing. Processing may be local or remote and may be moved from one processor to another processor. In certain embodiments, the computing device 100 is a multi-processor system and, thus, may include one or more additional processors which are communicatively coupled to the communication bus 110.

The processor 112 may be operable to execute logic and other computer readable instructions encoded in one or more tangible media, such as the memory 114. As used herein, logic encoded in one or more tangible media includes instructions which may be executable by the processor 112 or a different processor. The logic may be stored as part of software, hardware, integrated circuits, firmware, and/or micro-code, for example. The logic may be received from an external communication device via a communication network 140. The processor 112 may execute the logic to perform the functions, acts, or tasks described herein.

The memory 114 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 114 may include any desired type of mass storage device including hard disk drives, optical media, magnetic tape or disk, etc.

The memory 114 may include one or more memory devices. For example, the memory 114 may include cache memory, local memory, a mass storage device, volatile memory, non-volatile memory, or a combination thereof. The memory 114 may be adjacent to, part of, programmed with, networked with, and/or remote from processor 112, so the data stored in the memory 114 may be retrieved and processed by the processor 112, for example. The memory 114 may store instructions which are executable by the processor 112. The instructions may be executed to perform one or more of the acts or functions described herein.

The memory 114 may store an application 130 implementing the disclosed techniques. In certain embodiments, the application 130 may be accessed from or stored in different locations. The processor 112 may access the application 130 stored in the memory 114 and execute computer-readable instructions included in the application 130.

The network interface 116 may include one or more network adaptors. The network adaptors may be wired or wireless network adaptors. The network interface 116 may allow communication by the computing device 100 with an external network 140. The computing device 100 may communicate with other devices via the network interface 116 using one or more network protocols such as Ethernet, Internet Protocol (IP), Transmission Control Protocol (TCP), User Datagram Protocol (UDP), wireless network protocols such as Wi-Fi, Long Term Evolution (LTE) protocol, or other suitable protocols.

The input device(s) 118 may include a positional input device, such as a mouse, touchpad, touchscreen, or the like; a keyboard, button, switch, or the like; and/or other human and machine interface devices. The output device(s) 120 may include a display, which can be a liquid crystal display (LCD), a cathode-ray tube (CRT), a light emitting diode (LED) display (such as an OLED display), or other suitable display.

In certain embodiments, during an installation process, the application may be transferred from the input device 118 and/or the network 140 to the memory 114. When the computing device 100 is running or preparing to run the application 130, the processor 112 may retrieve the instructions from the memory 114 via the communication bus 110.

III. EXAMPLE SYSTEM

Figure 2:
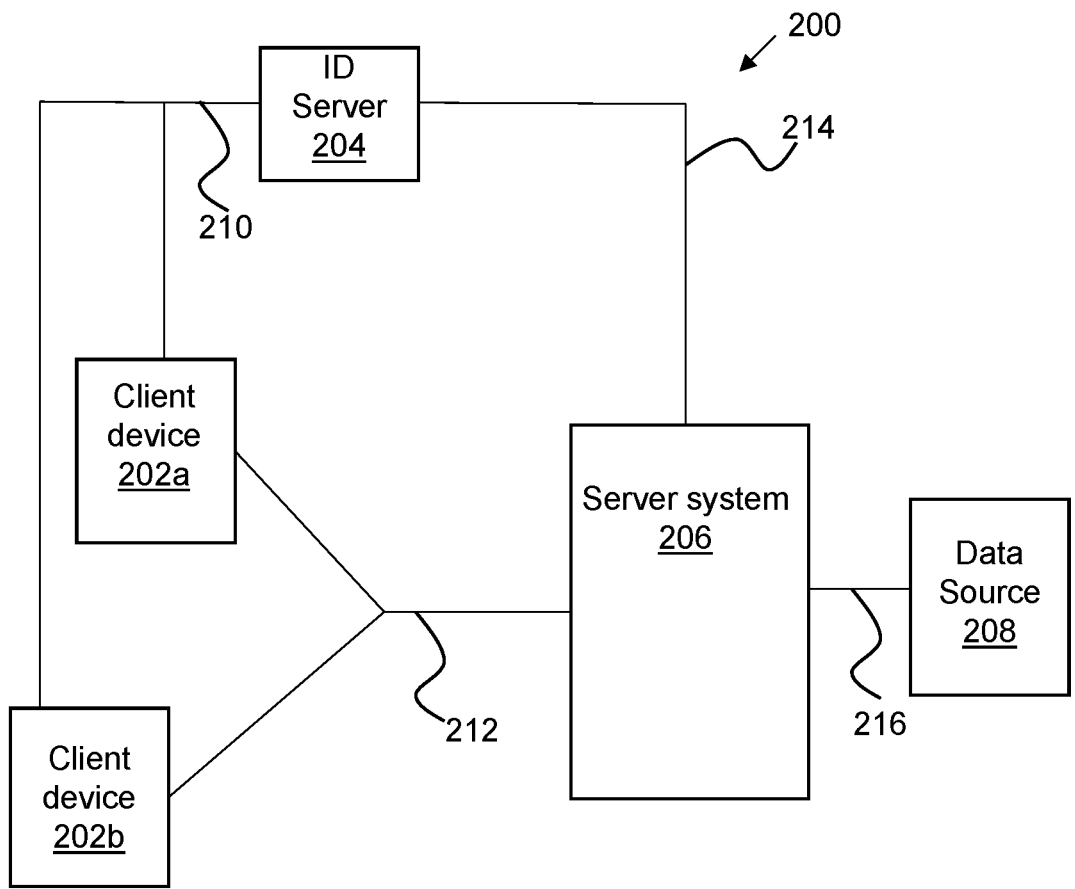
FIG. 2 illustrates a block diagram of an example system in which certain embodiments may be implemented.

FIG. 2 illustrates an example system 200 in which certain embodiments disclosed herein may be employed. The system 200 includes client devices 202a, 202b, an ID server 204, a server system 206, and a data source 208. One or more of the client device 202a, 202b, ID server 204, server system 206, and data source 208 may be implemented by a computing device, such as the computing device 100 described above with reference to FIG. 1. In this example, each client device 202a, 202b includes a respective client (that is, piece of software) running on a respective computing device.

The client devices 202a, 202b are in communication with the ID server 204 over a first network 210. For example, the first network 210 may be a local area network or wide area network such as the Internet. The client devices 202a, 202b are in communication with the server system 206 over a second network 212. The second network 212 is a multicast network, that is, a network in which multicast messaging may be implemented. For example, the second network 212 may be a suitable local area network, internal network, private network or virtual private network (VPN). The ID server 204 is in communication with the server system 206 over a third network 214. For example, the third network 214 may be a private network or a VPN. The server system 206 is in communication with the data source 208 over a fourth network 216. For example, the fourth network 216 may be a local area network or wide area network such as the Internet. One or more of the first network 210, the second network 212, the third network 214, and the fourth network 216 may be the same network.

In this example, each client device 202a, 202b, or a user thereof, has a pre-existing relationship with the data source 208. Specifically, each client device 202a, 202b, or a user thereof, has an account with the data source 208. In arrangements other than those depicted in FIG. 2, each client device 202a, 202b may connect directly to the data source 208, log-in to a particular account at the data source 208, and be provided by the data source 208 with a data stream including data that is tailored according to the particular account. In such other circumstances, through the different connections, the data source 208 may provide different data streams to the different client devices 202a, 202b. However, in the example of FIG. 2, the client devices 202a, 202b are not directly connected to the data source 208. Instead, in this example, the client devices 202a, 202b are in communication with the server system 206, which is configured to multicast data to the multiple client devices 202a, 202b over the second network 212. This provides an efficient and scalable way for the server system 206 to provide the same data to each of the multiple client devices 202a, 202b. However, it is desired that the server system 206 also provide data of the different data streams of the different accounts of the data source 208 to the appropriate client devices 202a, 202b. That is, it is desired that each client device 202a, 202b can obtain data of their respective associated data stream produced by the data source 208, from the server system 206. This may be the case, for example, where each client device 202a, 202b is using a platform provided by the server system 206, and it is desired that the data of the data streams be provided within the context of that platform.

In the example of FIG. 2, each client device 202a, 202b is associated with a data stream provided by the data source 208. As mentioned, different client devices 202a, 202b may wish to obtain data of different data streams provided by the data source 208. For example, one or more of the client devices 202a, 202b may be personal computers or mobile devices operated by a user. The user of a particular client device 202a, 202b may wish to be displayed data from a particular one of the data streams provided by the data source 208, specifically the data stream produced by the data source 208 for the account of the user. As another example, one or more of the client devices 202a, 202b may be servers or other computing devices. An algorithm or other process running on a particular one of the computing devices 202a, 202b may be configured to be provided with input data of a particular one of the data streams provided by the data source 208, specifically the data stream produced by the data source 208 for the account associated with the process.

Each client device 202a, 202b has connection information for establishing a connection with the data source 208 over which the data stream associated with the client device 202a, 202b can be received. For example, the connection information may be that which the particular client device 202a, 202b might otherwise have used to connect directly to the data source 208 to receive a data stream produced for the account associated with the particular client device 202a, 202b. The connection information for a particular client device 202a, 202b includes address information of the data source 208 and account information to access the data source 208. The address information includes an IP address and port number with which a TCP connection can be established to receive a data stream from the data source 208. The account information may include the log-in information that is used by the data source 208 to identify and access a particular account at the data source 208. For each particular account, the data source 208 provides a respective different data stream.

Each client device 202a, 202b provides their respective connection information for connecting to the data source 208 to the ID server 204. For example, this may occur on registration of each client device 202a, 202b with the platform provided by the server system 206. Accordingly, the ID server 204 obtains the connection information for each client device 202a, 202b. The ID server 204 associates the connection information for each different client device 202a, 202b with an identifier. As one example, the ID server 204 may generate an identifier for the connection information for each client device 202a, 202b. For example, a randomly generated identifier may be assigned to the connection information for each client device 202a, 202b. As another example, each identifier may be generated based on the connection information for the respective client device 202a, 202b. In yet another example, the identifiers need not necessarily be generated, and instead the ID server 204 may assign one of multiple pre-generated identifiers to the connection information for each client device 202a, 202b. Each identifier may be unique at least among the multiple client device 202a, 202b.

The ID server 204 provides, to the server system 206, for each client device 202a, 202b, the connection information for the client device 202a, 202b in association with the identifier associated with connection information for the client device. Accordingly, the server system 206 obtains the connection information for each client device 202a, 202b and the identifier associated with the connection information for each client device 202a, 202b. The server system 206 stores, for each client device 202a, 202b, the connection information in association with the identifier. For each client device 202a, 202b, the server system 206 uses the connection information to establish a connection with the data source 208. Specifically, for each client device 202a, 202b, the server system 206 uses the associated address information to establish a TCP connection with the data source 208, and uses the associated log-in information to access the associated account at the data source 208. For a given account, the data source 208 produces a data stream and transmits the data stream over the associated connection with the server system 206. In this case, there is a one-to-one mapping between the different data streams produced by the data source 208 and the number of connections between the server system 206 with the data source 208.

The ID server 204 also provides, to each client device 202a, 202b, the identifier associated with the connection information for the client device 202a, 202b. Accordingly, each client device 202a, 202b receives an identifier indicating a data stream associated with the client device 202a, 202b. Each client device 202a, 202b stores the received identifier. As a result, each client device 202a, 202b stores an identifier indicating a data stream associated with the client device 202a, 202b.

As a result of the above steps, each client device 202a, 202b stores an identifier indicating a data stream associated with the client device 202a, 202b. The server system 206 receives multiple of the data streams, each of the data streams including data. Specifically, the server system 206 receives, for each client device 202a, 202b, and from the data source 208, a data stream provided for the account associated with the client device 202a, 202b and over the connection established using the connection information for the client device 202a, 202b. As described in more detail below, the server system 206 multicasts data of the received streams, so each client device 202a, 202b can obtain data of the data stream with which it is associated. In this way, the data source 208 may be integrated with the platform provided by the server system 206. In examples, the server system 206 may perform conversion and/or translation of the data of each received data stream before multicasting the data. For example, the server system 206 may perform protocol translation from a protocol used and understood by the data source 208 (and hence according to which the data streams are received by the server system 206 from the data 208) into a protocol used and understood by the respective client devices 202a, 202b.

As mentioned, the server system 206 receives multiple of the data streams. In this example the server system 206 receives the multiple data streams over respective multiple different connections with the data source 208, as described above. The server system 206 determines the identifier for each of the multiple data streams. Specifically, for each of the received data streams, the server system 206 determines the identifier for the received data stream based on the connection over which the data stream is received. The server system 206 may store the identifiers each in association with respective connection information for establishing a connection over which a respective one of the data streams is received. Accordingly, the server system 206, for each of the multiple received data streams, is able to determine the identifier associated with the connection information of the connection over which the data stream is received as the identifier for the data stream. In other words, for a data stream received over a particular connection with the data source 208, the server system 206 can determine the identifier for that data stream as the identifier associated with the connection information for that connection.

The server system 206 transmits, to the multiple client devices 202a, 202b, a mapping between each identifier and a respective multicast stream, and multicasts data (for example suitably translated data) of the received data streams in accordance with the mapping. Each client device 202a, 202b receives the mapping between multiple identifiers and respective multiple multicast streams, matches the identifier stored at the client device 202a, 202b with an identifier in the mapping, and receives data of the multicast stream mapped to the matched identifier in the mapping. As described in more detail below with reference to FIG. 5 and FIG. 6, in some examples this may involve multicasting data of the received data streams using different multicast addresses. As described in more detail below with reference to FIG. 7, in some examples this may involve generating multicast streams each including a different identifier. In either case, providing the mapping to the multiple client devices 202a, 202b and multicasting data of the received data streams in accordance with the mapping allows for the client devices 202a, 202b to obtain data of the associated data stream via multicast. Tailored and scalable communication is therefore provided.

IV. MULTICAST ADDRESSES

In general, the server system 206 is configured to multicast data to the multiple client devices 202a, 202b. In some examples, IP multicast may be used. IP multicast uses the IP infrastructure in a network, such as the second network 212. In IPv4 and IPv6, specially reserved multicast IP address blocks are used. The server system 206 includes a multicast address as an IP destination address in the packets that it sends on the second network 212. Nodes in the second network 212, such as network switches and routers, replicate the packets so that the packets reach the multiple client devices 202a, 202b. Specifically, each client device 202a, 202b first registers their interest in receiving data sent using a particular multicast address by sending a join request to the network indicating the multicast address. For example, the join request may be sent using Internet Group Management Protocol (IGMP). The nodes of the second network 212 construct a multicast distribution tree for the particular multicast address based on the received join requests. For example, this may be done using Protocol Independent Multicast (PIM). Using the multicast distribution tree, the second network 212 routes multicast packets from the server system 206 having the particular multicast address as the destination address, to be received by each of the client devices 202a, 202b.

As mentioned, the server system 206 receives multiple data streams from the data source 208, determines the identifier for each received data stream, and transmits, to the multiple client devices 202a, 202b a mapping between each identifier and a respective multicast stream. In some examples, the mapping includes a mapping between each identifier and a respective different multicast address of a multicast stream. The different multicast addresses in the mapping represent different destination addresses that data of the different data streams will be multicast with by the server system 206. The server system 206 may generate the mapping. For example, the server system 206, for each data stream it receives, associates the identifier determined for the data stream with a multicast address. The server system 206 may assign a multicast address to a particular identifier from a pool of available multicast addresses. The server system 206 may store these assignments in a data structure, such as a table, thereby to generate the mapping.

Figures 3, 4:
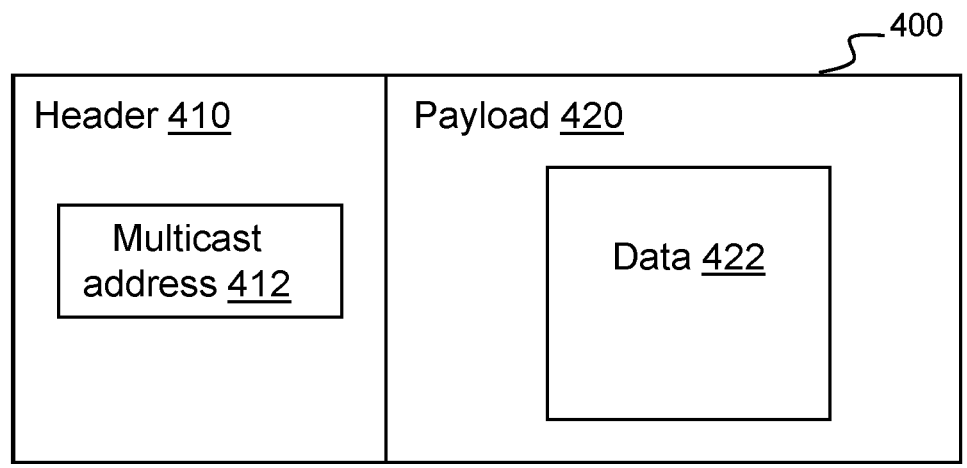
FIG. 3 illustrates a schematic diagram of a mapping according to a first example.
FIG. 4 illustrates a schematic diagram of a multicast packet according to the first example.

FIG. 3 shows an example mapping 302 between identifiers and respective multicast addresses. In this example, each multicast address incudes an IP address and port number. Specifically, in the example of FIG. 3, a first identifier 28454930 associated with a first data stream associated with a first client device 202a has been assigned a first multicast address having an IP address of 239.225.225.X and port number P, and a second identifier 74504482 associated with a second data stream associated with a second client device 202b has been assigned a second multicast address having an IP address of 239.225.225.Y and a port number of Q. In examples, the IP addresses of the first and second multicast address may be the same, and the port numbers may differ. In examples, the IP addresses of the first and second multicast address may be different, and the port numbers may be the same or different. In either case, a different multicast address is assigned to each different identifier, thereby to generate the mapping 302.

Returning to FIG. 2, in this example, the server system 206 broadcasts the mapping 302 to the multiple client devices 202a, 202b. Specifically, the server system 206 broadcasts the mapping over the second network 212, to be received by all the client devices 202a, 202b connected to the second network 212. For example, in IPv4, a packet may be broadcast to all devices on a network by including special values in the host identification part of the IP address. As another example, in IPv6, a broadcast to all client devices 202a, 202b connected to the second network 212 may be achieved by including an 'all-IPv6 devices' multicast address in the destination address. In either case, the mapping 302 is broadcast to all of the multiple client devices 202a, 202b. The mapping 302 may be included in a payload of one or more broadcast packets.

Each client device 202a, 202b receives, from the server system 602, the mapping 302 between the multiple identifiers and the respective multiple multicast addresses. Each client 202a, 202b can extract the mapping 302 from a received broadcast packet and match the identifier stored at the client device with an identifier included in the mapping 302. For example, for the first client device 202a, the first identifier stored at the first client device 202a is 28454930. The first client device 202a parses the mapping 302 to match the first identifier 28454930 with the identifier 28454930 in the mapping 302. Each client device 202a, 202b may then configure a communications interface of the client device 202a, 202b to receive data transmitted with a destination address corresponding to the multicast address mapped to the matched identifier in the mapping 302. For example, for the first client device 202a, the multicast address mapped to the matched identifier in the mapping 302 is the first multicast address, specifically IP address 239.225.225.X and port number P. The first client device 202a accordingly sends a join request to the second network 212 specifying the first multicast address specifically IP address 239.225.225.X and port number P. The second network 212 is then configured so that packets having the first multicast address as the destination address are routed to the first client device 202a. A communications interface of the first client device 202a is configured to receive (for example as opposed to drop) packets having the first multicast address as the destination address.

The server system 206 then, for each received data stream, multicasts data of the received data stream using the multicast address mapped to the identifier determined for the received data stream. For example, for each received data stream, the server system 206 may extract data from the received data stream and include the data (or data derived therefrom) into packets of a multicast stream. The server system 206 includes, as the destination address of the packets of the multicast stream, the multicast address mapped to the identifier determined for the received data stream. For example, referring again to FIG. 3, for the first data stream for which the first identifier 28454930 was determined, the server system generates a multicast stream based on the data from the first data stream, where all packets of the generated multicast stream have the first multicast address (that is, IP address 239.225.225.X and port number P) as the destination address.

FIG. 4 shows a multicast stream packet 400 according to an example. For each received data stream, an associated multicast stream may be made up of one or more such multicast packets 400. The multicast packet 400 includes a header 410 and a payload 420. For each received data stream, the header 410 of the associated multicast packet(s) includes, as the destination address, the multicast address 412 mapped to the identifier determined for the data stream, and the payload 420 includes data 422 of the received data stream. The data 422 of the received data stream may include data included in the received data stream and/or data derived from the data included in the received data stream. For example, for each received stream, the server system 206 may process, for example normalise, the data of the received data stream, and include the resulting processed, for example normalised, data as the data 422 in the one or more packets 400 of the associated multicast stream.

As a result, for each received data stream, the server system 206 is able to multicast a respective multicast stream using the multicast address mapped to the identifier determined for the received data stream. Accordingly, the data of the different received data streams can be received by the different client devices 202a, 202b based on the different multicast addresses used to multicast the data. Specifically, as mentioned above, each client device 202a, 202b receives, from the server system 206, a multicast stream transmitted with a destination address corresponding to the multicast address mapped to the identifier in the mapping 302 that matches the identifier stored by the client device 202a, 202b. In this example, since different multicast streams are multicast to respective different client devices 202a, 202b, each client device 202a, 202b may receive data from their associated data stream (for example as compared to transmitting data from all received data streams to all client devices 202a, 202b). Efficient scalable communication may therefore be provided.

V. MULTICAST STREAM INCLUDING AN IDENTIFIER

As mentioned, the server system 206 receives multiple data streams from the data source 208, determines the identifier for each received data stream, and transmits, to the multiple client devices 202a, 202b, a mapping between each identifier and a respective multicast stream. In some examples, the server system 206, for each of the multiple received data streams, generates a multicast stream including the identifier determined for the received data stream and data of the received data stream. The server system 206 then multicasts the generated multicast streams to the multiple client device 202a, 202b. In these examples, the mapping between each identifier and a respective multicast stream is encoded into the multicast streams themselves. That is, since each multicast stream is generated to include data from a received data stream and the identifier determined for the received data stream, each client device 202a, 202b is able to determine which multicast stream includes data from the data stream associated with them.

Figure 5:
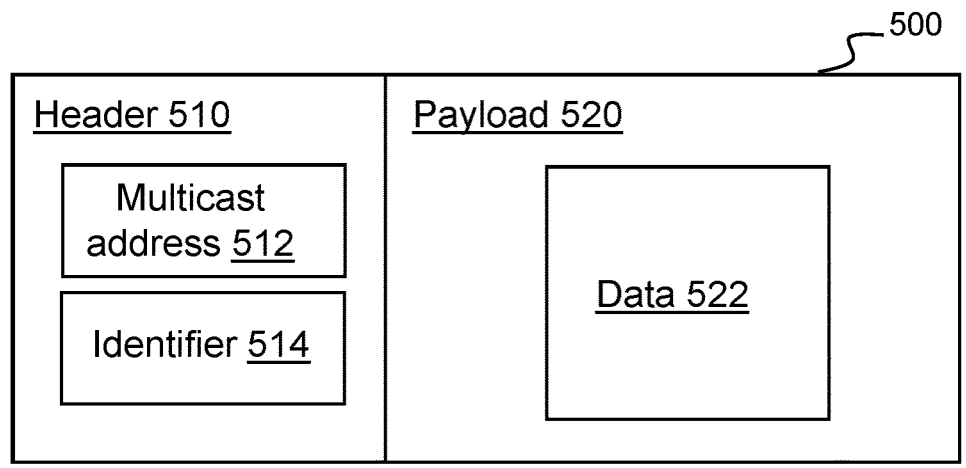
FIG. 5 illustrates a schematic diagram of a multicast packet according to a second example.

FIG. 5 shows a multicast stream packet 500 according to another example. For each received data stream, an associated multicast stream may be made up of one or more such multicast packets 500. The multicast packet 500 includes a header 510 and a payload 520. For each of the generated multicast streams, the header 510 includes the identifier 514 for the received data stream, and the payload includes data 522 of the received data stream. The data 522 of the received data stream may include data included in the received data stream and/or data derived from the data included in the received data stream. For example, for each received stream, the server system 206 may process, for example normalize, the data of the received data stream, and include the resulting processed, for example normalized, data as the data 522 in the one or more packets 500 of the associated multicast stream. For example, normalizing the data of a data stream may include translating the data into a format that will be understood by the client devices 202a, 202b. The different multicast streams can be differentiated by the different identifiers 514 included in the header 510 of the packets 500 of the multicast streams. In examples, each of the generated multicast streams is multicast by the server system 206 using the same multicast address 512. That is, each of the packets 500 of the different multicast streams may all include the same multicast address 512 as the destination address in the header 510. As an example, this may be a multicast address that the client devices 202a, 202b are configured to request the second network 212 to join as a default.

The server system 206 may generate a first multicast stream for a first received data stream by including data of the first data stream into the payload 520 of one or more multicast packets 500, and including into the header 510 of each of those multicast packets 500 the first identifier determined for the first data stream. The server system 206 may generate a second multicast stream for a second received data stream by including data of the second data stream into the payload 520 of one or more multicast packets 500, and including into the header 510 of each of those multicast packets 500 the second identifier determined for the first data stream. The server system 206 may multicast the multicast streams to all of the multiple client devices 202a, 202b, for example using the a multicast address 512 to which all of the client devices 202a, 202b are subscribed as the destination address in the header of the packets 500. Accordingly, both the first multicast stream and the second multicast stream are transmitted to both the first client device 202a and the second client device 202b.

Each client device 202a, 202b is configured to match the identifier stored at the client device 202a, 202b with an identifier in the mapping, and receive data of the multicast stream mapped to the matched identifier in the mapping. As mentioned, in this example, the mapping is provided by including each identifier in a respective different one of the multicast streams. Each client device 202a, 202b is configured to receive the multiple multicast streams, and obtain data from a multicast stream, of the multiple received multicast streams, that includes the identifier matched to the identifier stored at the client device 202a, 202b. For example, a client device 202a, 202b may be configured with an Applications Programming Interface (API) configured to receive the multicast streams, and parse a given multicast stream (or each packet thereof) to determine whether it includes an identifier 514 that matches the identifier stored at the client device 202a, 202b. For example, functions of the API may inspect the header 510 of each received multicast packet 500 to determine if it includes an identifier 514 that matches the identifier stored by the client device 202a, 202b. If the multicast stream (or packet(s) thereof) does not include an identifier that matches the stored identifier, a function of the API may drop the multicast stream or packet. However, if the multicast stream (or packet(s) thereof) does include an identifier that matches the stored identifier, a function of the API may pass the packet (or at least a part of the data 522 thereof) to the client device 202a, 202b. Each client device 202a, 202b therefore obtains data of their associated data stream.

In this example, since the mapping is encoded into the multicast streams themselves, there is no need for the server system 206 to carry out separate messaging to communicate the mapping to the client devices 202a, 202b. Efficient scalable communication may therefore be provided. Further, in this example, since the mapping is encoded into the multicast streams themselves, each multicast stream can use the same multicast address. Efficient and scalable use of multicast address allocation may therefore be provided. Moreover, since each multicast stream can use the same multicast address, separate steps associated with different client devices 202a, 202b requesting to join separate multicast addresses need not be carried out. Efficient scalable communication may therefore be provided.

In some examples, the ID server 204 includes a permissions server (not shown) that stores permissions of each client device 202a, 202b (or a user thereof) to obtain data from a certain data stream. In these examples, for each client device 202a, 202b, (or user thereof) the permissions server stores client device information of the client device 202a, 202b in association with one or more identifiers for the respective one or more data streams that the client device 202a, 202b (or user thereof) is permissioned to obtain data from. In these examples, the API of each client device 202a, 202b communicates with the permissions server over the first network 202a, 202b. Specifically, for each client device 202a, 202b, the API of the client device 202a, 202b provides the client device information for the client device 202a, 202b to the permissions server. The permissions server uses the provided client device information to determine the one or more identifiers for the respective one or more data streams that the client device 202a, 202b is permissioned to obtain data of. The permissions server then provides the determined one or more identifiers to the API, and the API may store the one or more identifiers at the client device 202a, 202b. The API then uses these stored identifiers to match (or not) against the identifiers included in the multicast streams received by the client device 202a, 202b. This provides a way to implement central control over the data streams that each client device 202a, 202b may or may not obtain data from via the server system 206.

VI. VARIATIONS

The system 200, the components thereof, and the operations of the components, described above with reference to FIG. 2 to FIG. 5 relate to illustrative examples. In other examples, variations may be made to the above examples.

For example, in the above examples the ID server 204 generates the identifiers in association with connection information and provides the identifiers to the respective client devices 202a, 202b and provides the identifiers and the connection information to the server system 206. However, it will be appreciated that this need not necessarily be the case and in other examples, other ways of providing the identifiers may be used. For example, each received data stream may itself contain an identifier, for example an identifier for the stream. For example, the identifier may encode or otherwise indicate the type of data or specific combination of data in the data stream. Each client device 202a, 202b may also store such an identifier. For example, each client device 202a, 202b may store such an identifier indicating the type of data or specific combination of data that the client device is to obtain or is configured to use. In these examples, the server system 206 may determine the identifier for each of the multiple received data streams from each data stream directly. In such examples, the system 200 need not necessarily include the ID server 204.

As another example, in the above examples it is described that the multiple data streams are received from the data source 208. However, it will be appreciated that this need not necessarily be the case and that in other examples the multiple data streams may be received from multiple data sources (not shown). In these examples, the server system 206 may receive the multiple data streams from two or more data sources. For example, it may be that each different data source provides a respective different data stream to the server system 206. In such examples, the connection information provided by each client device 202a, 202b may be for establishing a connection with a respective different data source 208 over which the associated data stream is transmitted. Alternatively, or additionally, in such examples, each data stream received from a given data source by the server system 206 may itself include an identifier for the data stream. For example, the identifier may indicate the data source from which the data stream is received. The server system 206 may determine the identifier for each data stream as the identifier indicating the data source from which the data stream is received. In such examples, each client device 202a, 202b may store such an identifier indicating data source providing the data stream that the client device is to use or is configured to use.

As another example, in the above examples it is described that the multiple data streams are received from the data sources 208. However, it will be appreciated that this need not necessarily be the case and that in other examples a separate data source 208 need not necessarily be used. For example, in some examples, a component of the server system 206 may act as a data source and generate the different data streams which are received by a processor of the server system 206. In these examples, the server system 206 may determine the identifier for each stream by assigning an identifier to each of the generated streams. For example, as above, each identifier may encode or otherwise indicate the type of data or specific combination of data in the data stream. In these examples, the system need not necessarily include a separate data source 208.

As another example, in the above examples it is described that the data source 208 and the ID server 204 are separate to the server system 206. That is, the ID server 204 communicates with the server system 206 over the third network 214, and the data source 208 communicates with the server system 206 over the fourth network. However, it will be appreciated that this need not necessarily be the case, and that in other examples (not shown), the data source 208 and/or the ID server 204 may be part of or otherwise incorporated into the server system 206. That is, in some examples, the server system 206 may additionally provide the functionality of the ID server 204 and/or the data source 208 as described above.

As another example, in some of the above examples there are two client devices 202a, 202b and it is described that each client device 202a, 202b is associated with a different data stream provided by the data source 208, and that each client device 202a, 202b stores a different identifier and obtains data from a respective different multicast stream. However, it will be appreciated that this need not necessarily be the case, and that in other examples, there may be any number of client devices 202a, 202b, and that in some examples two or more of the client devices 202a, 202b may be associated with the same data stream provided by the data source 208 and may store the same identifier and obtain the same data from the same multicast stream. For example, two or more of the client devices 202a, 202b may each be used by or operating on behalf of the same user. These two or more client devices 202a, 202b may store the same identifier and obtain the same data from the same multicast stream. In this case, for example, a third client device 202a, 202b may store a different identifier and obtain data from a different multicast stream, for example as described above.

As another example, in the above examples, it is described that the system 200 includes multiple client devices 202a, 202b. That is, in the above examples, it is described that there are multiple computing devices each running a respective client. However, it will be appreciated that this need not necessarily be the case, and that more generally the system 200 may include multiple clients running on one or more computing devices. For example, each different client may run on a respective different computing device (each forming a different client device 202a, 202b) as described above. However, in other examples, each different client (that is, application or other piece of software) may run on one or more computing devices. For example, there may be multiple different clients running on one computing device, such as may be the case where a device is operating on behalf of multiple users. In either case, each client may be associated with a different data stream (for example provided by the data source 208) and each client may store a different identifier and obtain data of different multicast streams, as described above. Accordingly, the server system 206 may be configured to multicast data to multiple clients, each client storing an identifier indicating a data stream associated with the client, for example as described above for the multiple client devices 202a, 202b. Accordingly, it will be appreciated that references to 'client devices 202a, 202b' in the examples described herein may be taken to refer more generically to 'clients 202a, 202b', where the 'clients 202a, 202b' may be running on one or more computing devices. Other variations may be made.

VII. EXAMPLE METHODS

Figure 6:
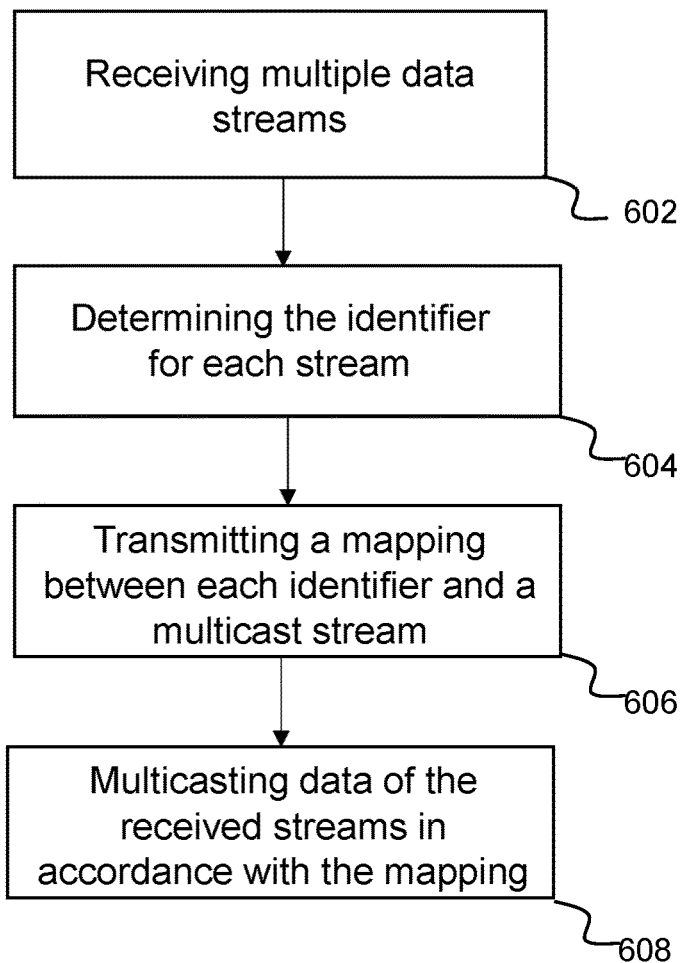
FIG. 6 illustrates a flow diagram of a method performed by a server system according to certain embodiments.

Referring to FIG. 6, there is a flow diagram illustrating a method according to an example. The method may be performed by a server system, for example the server system 206 according to any of the examples described above with reference to FIG. 1 to FIG. 5. In examples, the server system includes a processor (for example, the processor 112 of FIG. 1) and a memory (for example, the memory 114 of FIG. 1). The method may be performed by the processor. The processor may be configured to perform the method. The memory may store instructions which, when executed, cause at least one processor (for example, the processor 112 of FIG. 1) of a server system to perform the method, or functions defined by the method. For example, the memory may store an application (for example, the application 130 of FIG. 1) including the instructions. The server system, for example a processor thereof, is configured to multicast data to multiple clients, for example the client devices 202a, 202*b* according to any one of the examples described above with reference to FIG. 1 to FIG. 5. The multiple clients each store an identifier indicating a data stream associated with the client.

The method includes, in step 602, receiving multiple of the data streams, each data stream including data. For example, the multiple data streams may be received over respective multiple different connections with the data source 208, as described above.

The method includes, in step 604, determining the identifier for each of the multiple received data streams. For example, for each received data stream, the identifier for the received data stream may be determined based on the connection over which the data stream is received, as described above.

The method includes, in step 606, transmitting, to the multiple clients, a mapping between each identifier and a respective multicast stream.

The method includes, in step 608, multicasting data of the multiple received data streams in accordance with the mapping.

In a first example, the mapping may include a mapping between each identifier and a respective different multicast address of a multicast stream. In this first example, transmitting the mapping to the multiple clients may include broadcasting the mapping over a network to which each of the multiple clients is connected. In this first example, multicasting data of the multiple received data streams in accordance with the mapping includes, for each received data stream, multicasting data of the received data stream using the multicast address mapped to the identifier determined for the data stream.

In a second example, transmitting the mapping to the multiple clients and multicasting data of the multiple received data streams in accordance with the mapping includes, for each of the received data streams, generating a multicast stream including the identifier for the received data stream and data of the received data stream, thereby to encode the mapping into each multicast stream, and multicasting each of the generated multicast streams to the multiple clients. In this second example, each generated multicast stream may include one or more multicast packets each including a header and a payload, and, for each of the generated multicast streams, generating the multicast stream including the identifier includes including the identifier for the received data stream into the header of the packets of the multicast stream and including data of the received data stream into the payload of the packets of the multicast stream.

Figure 7:
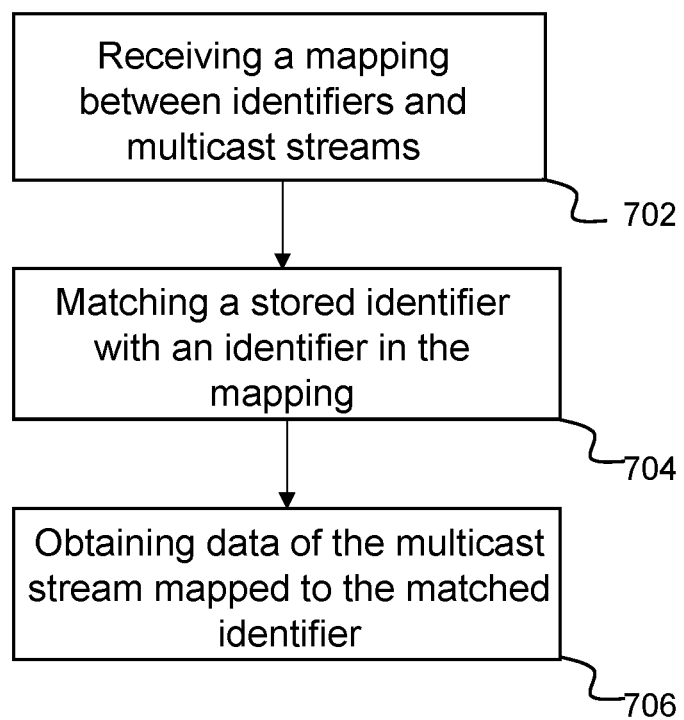
FIG. 7 illustrates a flow diagram of a method performed by a client device according to certain embodiments.

Referring to FIG. 7, there is a flow diagram illustrating a method according to another example. The method may be performed by a client system, for example by each of one or more of the client devices 202*a*, 202*b*, or more generally a computing system running one or more clients, according to any one of the examples described above with reference to FIG. 1 to FIG. 5. In examples, each client is implemented by a client system including a processor (for example, the processor 112 of FIG. 1) and a memory (for example, the memory 114 of FIG. 1). The method may be performed by the processor. The processor may be configured to perform the method. The memory 114 may store instructions which, when executed, cause at least one processor (for example, the processor 112 of FIG. 1) of a client system to perform the method, or functions defined by the method. The memory of the client system stores an identifier indicating a data stream associated with the client system. For example, the data stream may be one of the data streams received by the server system 206 as described above with reference to FIG. 1 to FIG. 5.

The method includes, in step 702, receiving, from a server system (for example the server system 206 according to any one of the examples described above with reference to FIG. 1 to FIG. 5) a mapping between multiple identifiers and respective multiple multicast streams.

The method includes, in step 704, matching the stored identifier with an identifier in the mapping.

The method includes, in step 706, obtaining data of the multicast stream mapped to the matched identifier in the mapping.

In a first example, the mapping includes a mapping between the multiple identifiers and respective multiple different multicast addresses, and obtaining data of the multicast stream mapped to the matched identifier in the mapping includes configuring a communications interface (for example, the network interface 116 of FIG. 1) of the client system to receive data transmitted with a destination address corresponding to the multicast address mapped to the matched identifier in the mapping.

In a second example, the mapping is provided by including each identifier in a respective different one of a multiple multicast streams, and receiving the mapping includes receiving the multiple multicast streams. In this second example, obtaining data of the multicast stream mapped to the matched identifier in the mapping includes obtaining data from a multicast stream, of the multiple received multicast streams, that includes the identifier matched to the stored identifier.

Figure 8:
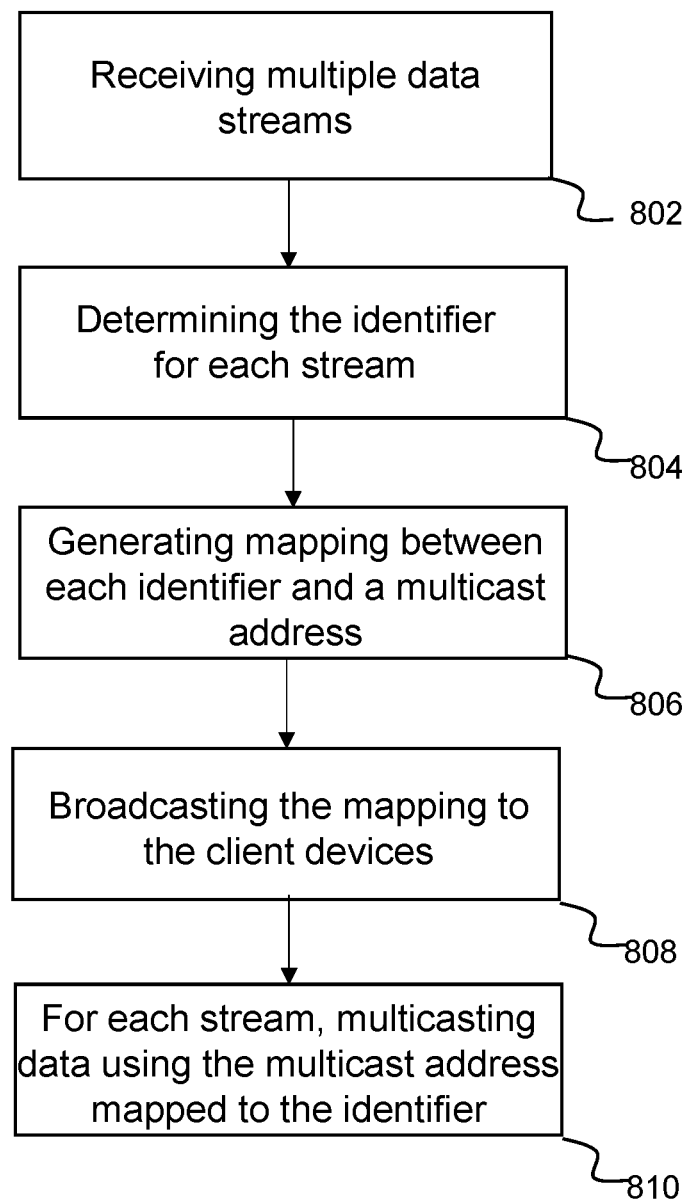
FIG. 8 illustrates a flow diagram of a method performed by a server system according to the first example.

Referring to FIG. 8, there is a flow diagram illustrating a method according to an example. The method may be performed by a server system, for example the server system 206 according to any of the examples described above with reference to FIG. 1 to FIG. 5. In examples, the server system includes a processor (for example, the processor 112 of FIG. 1) and a memory (for example, the memory 114 of FIG. 1). The method may be performed by the processor. The processor may be configured to perform the method. The memory may store instructions which, when executed, cause at least one processor (for example, the processor 112 of FIG. 1) of a server system to perform the method, or functions defined by the method. For example, the memory may store an application (for example, the application 130 of FIG. 1) including the instructions. The server system, for example a processor thereof, is configured to multicast data to multiple clients, for example the client devices 202*a*, 202*b* or more generally clients according to any one of the examples described above with reference to FIG. 1 to FIG. 5. The multiple clients each store an identifier indicating a data stream associated with the client.

The method includes, in step 802, receiving multiple of the data streams, each data stream including data. For example, the multiple data streams may be received over respective multiple different connections with the data source 208, as described above.

The method includes, in step 804, determining the identifier for each of the multiple received data streams. For example, for each received data stream, the identifier for the received data stream may be determined based on the connection over which the data stream is received, as described above.

The method includes, in step 806, generating a mapping between each identifier and a respective different multicast address.

The method includes, in step 808, broadcasting the mapping to the multiple clients.

The method includes, in step 810, for each received data stream, multicasting data of the received data stream using the multicast address mapped to the identifier determined for the received data stream.

Figure 9:
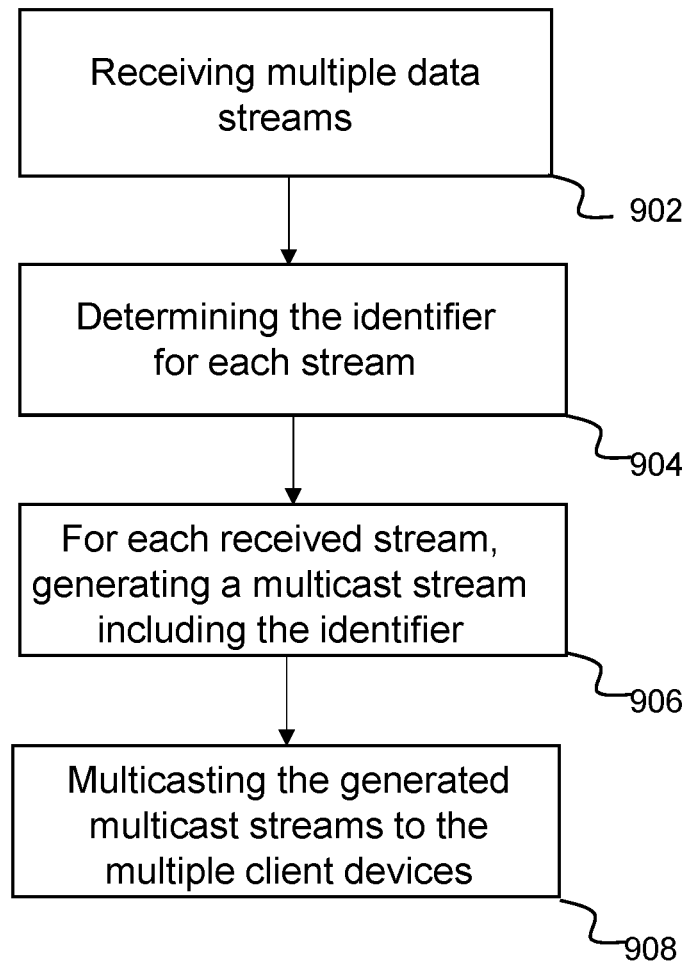
FIG. 9 illustrates a flow diagram of a method performed by a server system according to the second example.

Referring to FIG. 9, there is a flow diagram illustrating a method according to an example. The method may be performed by a server system, for example the server system 206 according to any of the examples described above with reference to FIG. 1 to FIG. 5. In examples, the server system includes a processor (for example, the processor 112 of FIG. 1) and a memory (for example, the memory 114 of FIG. 1). The method may be performed by the processor. The processor may be configured to perform the method. The memory may store instructions which, when executed, cause at least one processor (for example, the processor 112 of FIG. 1) of a server system to perform the method, or functions defined by the method. For example, the memory may store an application (for example, the application 130 of FIG. 1) including the instructions. The server system, for example a processor thereof, is configured to multicast data to multiple clients, for example the client devices 202*a*, 202*b* or more generally clients according to any one of the examples described above with reference to FIG. 1 to FIG. 5. The multiple clients each store an identifier indicating a data stream associated with the client.

The method includes, in step 902, receiving multiple of the data streams, each data stream including data. For example, the multiple data streams may be received over respective multiple different connections with the data source 208, as described above.

The method includes, in step 904, determining the identifier for each of the multiple received data streams. For example, for each received data stream, the identifier for the received data stream may be determined based on the connection over which the data stream is received, as described above.

The method includes, in step 906, for each of the received data streams, generating a multicast stream including the identifier for the received data stream and data of the received data stream. For example, each generated multicast stream may include one or more multicast packets each including a header and a payload, and, for each of the generated multicast streams, generating the multicast stream including the identifier may include including the identifier for the received data stream into the header of the packets of the multicast stream and including data of the received data stream into the payload of the packets of the multicast stream.

The method includes, in step 908, multicasting the generated multicast streams to the multiple clients.

VIII. EXAMPLE ELECTRONIC TRADING SYSTEM

Figure 10:
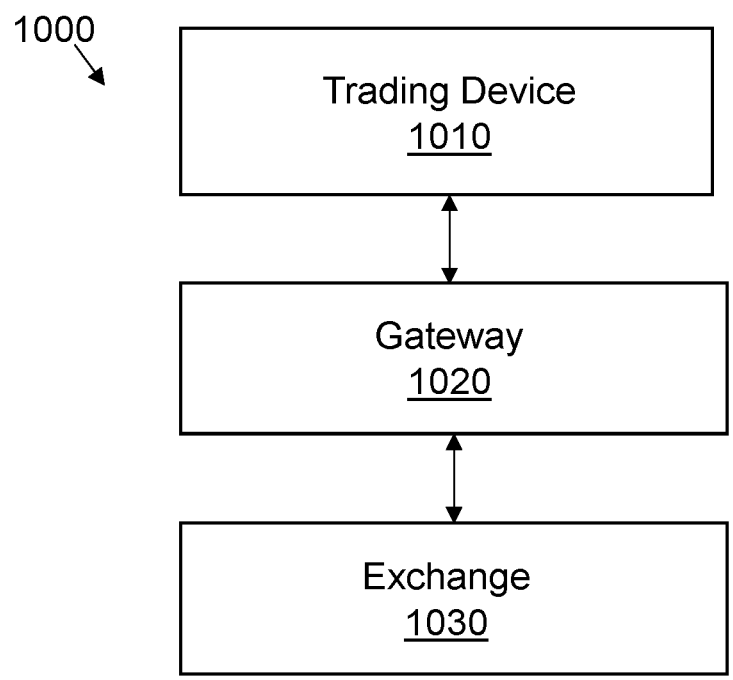
FIG. 10 illustrates a block diagram of an example electronic trading system in which certain embodiments may be employed.

FIG. 10 illustrates a block diagram representative of an example electronic trading system 1000 in which certain embodiments may be employed. The system 1000 includes a trading device 1010, a gateway 1020, and an exchange 1030. The trading device 1010 is in communication with the gateway 1020. The gateway 1020 is in communication with the exchange 1030. As used herein, the phrase "in communication with" encompasses direct communication and/or indirect communication through one or more intermediary components. The trading device 1010, the gateway 1020 and/or the exchange 1030 may include one or more computing devices 100 of FIG. 1. The exemplary electronic trading system 1000 depicted in FIG. 10 may be in communication with additional components, subsystems, and elements to provide additional functionality and capabilities without departing from the teaching and disclosure provided herein.

In operation, the trading device 1010 may receive market data from the exchange 1030 through the gateway 1020. The trading device 1010 may send messages to the exchange 1030 through the gateway 1020. A user may utilize the trading device 1010 to monitor the market data and/or base a decision to send an order message to buy or sell one or more tradeable objects to the exchange 1030. The trading device 1010 may use the market data to take trade actions such as to send an order message to the exchange 1030. For example, the trading device may run an algorithm that uses the market data as input and outputs trade actions, such as to send an order message to the exchange 1030. The algorithm may or may not require input from a user in order to take the trade actions.

Market data may include data about a market for a tradeable object. For example, market data may include the inside market, market depth, last traded price ("LTP"), a last traded quantity ("LTQ"), or a combination thereof. The inside market refers to the highest available bid price (best bid) and the lowest available ask price (best ask or best offer) in the market for the tradeable object at a particular point in time (since the inside market may vary over time). Market depth refers to quantities available at price levels including the inside market and away from the inside market. Market depth may have "gaps" due to prices with no quantity based on orders in the market.

The price levels associated with the inside market and market depth can be provided as value levels which can encompass prices as well as derived and/or calculated representations of value. For example, value levels may be displayed as net change from an opening price. As another example, value levels may be provided as a value calculated from prices in two other markets. In another example, value levels may include consolidated price levels.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange, a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object; a command to initiate managing orders according to a defined trading strategy; a command to change, modify, or cancel an order; an instruction to an electronic exchange relating to an order; or a combination thereof.

The trading device 1010 may include one or more electronic computing platforms. For example, the trading device 1010 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 1010 may include a single or multi-core processor in communication with a memory or other storage medium configured to accessibly store one or more computer programs, applications, libraries, computer readable instructions, and the like, for execution by the processor.

By way of example, the trading device 1010 may include a computing device, such as a personal computer or mobile device, in communication with one or more servers, where collectively the computing device and the one or more servers are the trading device 1010. For example, the trading device 1010 may be a computing device and one or more servers together running TTR Platform, an electronic trading platform provided by Trading Technologies International, Inc. of Chicago Illinois ("Trading Technologies"). For example, the one or more servers may run one part of the TT platform, such as a part providing a web server, and the computing device may run another part of the TT platform, such as a part providing a user interface function on a web browser. The computing device and the server may communicate with one another, for example using browser session requests and responses or web sockets, to implement the TT platform. As another example, the trading device 1010 may include a computing device, such as a personal computer or mobile device, running an application such as TT® Desktop or TT® Mobile, which are both electronic trading applications also provided by Trading Technologies. As another example, the trading device 1010 may be one or more servers running trading tools such as ADL®, AUTOSPREADER®, AUTOTRADER™, and/or MD TRADER®, also provided by Trading Technologies.

The trading device 1010 may be controlled or otherwise used by a user. As used herein, the phrase "user" may include, but is not limited to, a human (for example, a trader), trading group (for example, a group of traders), or an electronic trading device (for example, an algorithmic trading system). One or more users may be involved in the control or other use of the trading device.

The trading device 1010 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may be implemented utilizing computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 1010 from another computer readable medium. For example, the trading application (or updates to the trading application) may be stored by a manufacturer, developer, or publisher on one or more CDs, DVDs, or USB drives, which are then loaded onto the trading device 1010 or to a server from which the trading device 1010 retrieves the trading application. As another example, the trading device 1010 may receive the trading application (or updates to the trading application) from a server, for example, via the Internet or an internal network. The trading device 1010 may receive the trading application or updates when requested by the trading device 1010 (for example, "pull distribution") and/or un-requested by the trading device 1010 (for example, "push distribution").

The trading device 1010 may be adapted to send order messages. For example, the order messages may be sent to through the gateway 1020 to the exchange 1030. As another example, the trading device 1010 may be adapted to send order messages to a simulated exchange in a simulation environment which does not effectuate real-world trades.

The order messages may be sent at the request of a user. For example, a trader may utilize the trading device 1010 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 1010 to the exchange 1030 through the gateway 1020. The trading device 1010 may communicate with the gateway 1020 using a local area network, a wide area network, a multicast network, a wireless network, a virtual private network, an internal network, a cellular network, a peer-to-peer network, a point-of-presence, a dedicated line, the Internet, a shared memory system and/or a proprietary network.

The gateway 1020 may include one or more electronic computing platforms. For example, the gateway 1020 may be implemented as one or more desktop computer, handheld device, laptop, server, a portable computing device, a trading terminal, an embedded trading system, workstation with a single or multi-core processor, an algorithmic trading system such as a "black box" or "grey box" system, cluster of computers, or any combination thereof.

The gateway 1020 facilitates communication. For example, the gateway 1020 may perform protocol translation for data communicated between the trading device 1010 and the exchange 1030. The gateway 1020 may process an order message received from the trading device 1010 into a data format understood by the exchange 1030, for example. Similarly, the gateway 1020 may transform market data in an exchange-specific format received from the exchange 1030 into a format understood by the trading device 1010, for example. As described in more detail below with reference to FIG. 11, in some examples, the gateway 1020 may be in communication with cloud services, which may support functions of the gateway 1020 and/or the trading device 1010.

The gateway 1020 may include a trading application, similar to the trading applications discussed above, that facilitates or improves electronic trading. For example, the gateway 1020 may include a trading application that tracks orders from the trading device 1010 and updates the status of the order based on fill confirmations received from the exchange 1030. As another example, the gateway 1020 may include a trading application that coalesces market data from the exchange 1030 and provides it to the trading device 1010. In yet another example, the gateway 1020 may include a trading application that provides risk processing, calculates implieds, handles order processing, handles market data processing, or a combination thereof.

In certain embodiments, the gateway 1020 communicates with the exchange 1030 using a local area network, a wide area network, a multicast network, a wireless network, a virtual private network, an internal network, a cellular network, a peer-to-peer network, a point-of-presence, a dedicated line, the Internet, a shared memory system, and/or a proprietary network.

The exchange 1030 may be owned, operated, controlled, or used by an exchange entity. Example exchange entities include the CME Group, the Chicago Board Options Exchange, the Intercontinental Exchange, and the Singapore Exchange. The exchange 1030 may be an electronic exchange that includes an electronic matching system, such as a computer, server, or other computing device, which is adapted to allow tradeable objects, for example, offered for trading by the exchange, to be bought and sold. The exchange 1030 may include separate entities, some of which list and/or administer tradeable objects and others which receive and match orders, for example. The exchange 1030 may include an electronic communication network ("ECN"), for example.

The exchange 1030 is adapted to receive order messages and match contra-side trade orders to buy and sell tradeable objects. Unmatched trade orders may be listed for trading by the exchange 1030. Once an order to buy or sell a tradeable object is received and confirmed by the exchange, the order is considered to be a working order until it is filled or cancelled. If only a portion of the quantity of the order is matched, then the partially filled order remains a working order. The trade orders may include trade orders received from the trading device 1010 or other devices in communication with the exchange 1030, for example. For example, typically the exchange 1030 will be in communication with a variety of other trading devices (which may be similar to trading device 1010) which also provide trade orders to be matched.

The exchange 1030 is adapted to provide market data. Market data may be provided in one or more messages or data packets or through a shared memory system. For example, the exchange 1030 may publish a data feed to subscribing devices, such as the trading device 1010 or gateway 1020. The data feed may include market data.

The system 1000 may include additional, different, or fewer components. For example, the system 1000 may include multiple trading devices, gateways, and/or exchanges. In another example, the system 1000 may include other communication devices, such as middleware, firewalls, hubs, switches, routers, servers, exchange-specific communication equipment, modems, security managers, and/or encryption/decryption devices.

In examples, the trading device 1010 may be provided by a client device 202a, 202b according to any of the examples described above with reference to FIG. 1 to FIG. 9. For example, the trading device 1010 may be configured to provide the same or similar functionality as client device 202a, 202b according to any of the examples described above with reference to FIG. 1 to FIG. 9. The gateway 1020 may be provided by or include the server system 206 of any of the examples described above with reference to FIG. 1 to FIG. 9. For example, the gateway 1010 may be configured to provide the same or similar functionality as the server system 206 according to any of the examples described above with reference to FIG. 1 to FIG. 9. For example, the gateway 1020 may multicast data to the trading device 1010 (as well as multiple other such trading devices, which are not shown in FIG. 10). For example, the gateway 1020 may obtain the market data from the exchange 1030, and multicast this data to the trading device 1010.

In examples, the gateway 1020 may receive multiple data streams. The gateway 1020 may multicast data of the multiple received data streams to the trading device(s) 1010 in accordance with a mapping, for example as described above for the server system 206 with reference to FIG. 1 to FIG. 9. For example, the gateway 1020 may translate the data of the data streams into a format that will be understood by the trading device(s) 1010. The multiple streams may be received from a data source (not shown in FIG. 10) for example, a data source 208 according to any one of the examples described above with reference to FIG. 1 to FIG. 9. In examples, the data source 208 may be separate to, for example in addition to, the exchange 1030. In these examples, the data source 208 may represent a server or other computing device that provides data to the gateway 1020 in addition to the market data provided by the exchange 1030. For example, the data source 208 may provide price data provided by liquidity providers. For example, different liquidity providers may provide different prices for liquidity. In these examples, the multiple different data streams may include price data provided by respective different liquidity providers or respective different combinations of liquidity providers. By multicasting the same market data from the exchange 1030 to all trading devices 1010, and also multicasting data of multiple different received streams so that different trading devices can obtain different data (as described above with reference to FIG. 1 to FIG. 9), the gateway 1020 may provide for efficient, scalable and tailored messaging. In examples, the trading device 1010 may use the data of the associated data stream from the data source 208 to inform a trading decision. For example, the trading decision may be implemented as an order message sent to the exchange 1030 via the gateway 1020, for example as described above.

IX. SPECIFIC EXAMPLE ELECTRONIC TRADING SYSTEM

Figure 11:
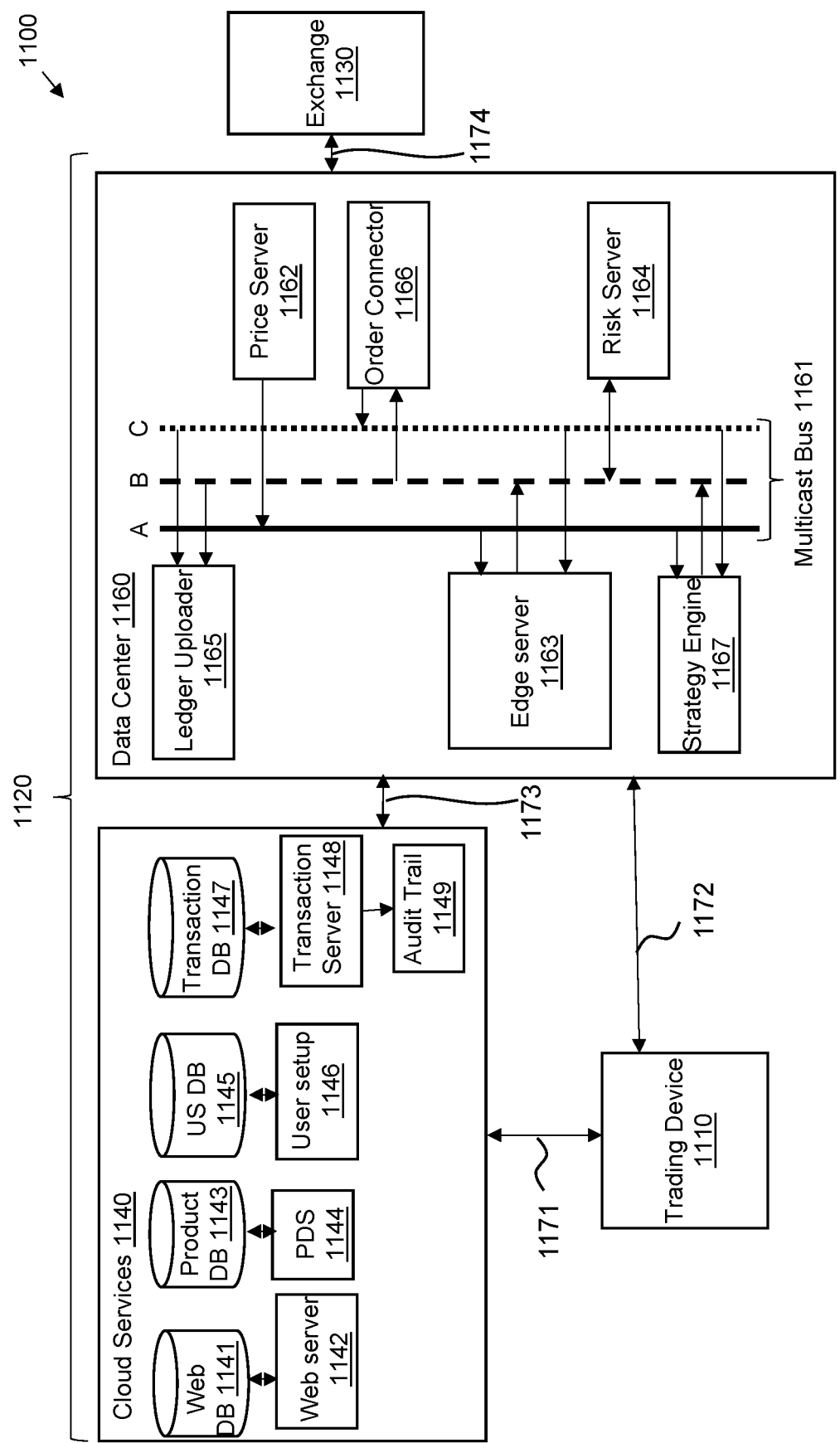
FIG. 11 illustrates a block diagram of another example electronic trading system in which certain embodiments may be employed.

FIG. 11 illustrates a block diagram representative of an example electronic trading system 1100 in which certain embodiments may be employed. The electronic trading system 1100 includes a trading device 1110, a hybrid cloud system 1120, and an exchange 1130. The trading device 1110 may be the same or similar to the trading device 1010 described above with reference to FIG. 10. The exchange 1130 may be the same or similar to the exchange 1030 described above with reference to FIG. 10. The hybrid cloud system 1120, or one or more components thereof, may provide one or more of the functions of the gateway 1020 described above with reference to FIG. 10. That is, the functionality of the gateway 1020 described above with reference to FIG. 10, or one or more parts of that functionality, may be included within the hybrid cloud system 1120.

The hybrid cloud system 1120 includes cloud services 1140 and data center 1160. In the example illustrated in FIG. 11, the cloud services 1140 and the components thereof are separate from the data center 1160. However, in other examples (not shown), one or more or all of the components and/or functions of the cloud services 1140 may instead be implemented in the data center 1160. In such examples, or otherwise, the electronic trading system 1100 may not include the cloud services 1140. In such examples, one or more of the functions of the gateway 1020 described above with reference to FIG. 10 may be provided by the data center 1160, or one or more components thereof, alone.

In order to provide lower latency for time sensitive processes, the data center 1160 may be co-located with the exchange 1130 or located in proximity to the exchange 1130. Accordingly, functions of the hybrid cloud system 1120 that are time sensitive or otherwise benefit from a lower latency with the exchange 1130, may be carried out by the data center 1160. In general, functions of the hybrid cloud system 1120 that are not time sensitive or do not benefit from lower latency with the exchange 1130, may be carried out by the cloud services 1140. The hybrid cloud system 1120 allows for the electronic trading system 1100 to be scalable with respect to non-time critical functions while still providing relatively low latency with the exchange 1130.

In the example of FIG. 11, the trading device 1110 is in communication with the cloud services 1140 over a first network 1171. For example, the first network 1171 may be a wide area network such as the Internet using a hypertext transfer protocol (HTTP) connection. The trading device 1110 is in communication with the data center 1160 over a second network 1172. For example, the trading device 1110 may communicate with the data center 1160 over a virtual private network or using a secure web socket or a TCP connection. The first network 1171 and the second network 1172 may be the same network. The data center 1160 communicates with the cloud services 1140 over a third network 1173. For example, the data center 1160 may communicate with the cloud services 1140 over a private network or virtual private network (VPN) tunnel. The third network 1173 may be the same as the first network 1171 and/or the second network 1172. The data center 1160 communicates with the exchange 1130 over a fourth network 1174. For example, the data center 1160 may communicate with the exchange 1130 using a local area network, a wide area network, a multicast network, a wireless network, a virtual private network, an internal network, a cellular network, a peer-to-peer network, a point-of-presence, a dedicated line, the Internet, a shared memory system, and/or a proprietary network. The fourth network 1174 may be the same as the first network 1171, the second network 1172 and/or the third network 1173.

The cloud services 1140 may be implemented as a virtual private cloud, which may be provided by a logically isolated section of an overall web services cloud. In this example, the cloud services 1140 include a web database 1141 and associated web server 1142, a product database 1143 and associated product data server (PDS) 1144, a user setup database 1145 and associated user setup server 1146, and a transaction database 1147 and associated transaction server 1148.

The trading device 1110 may communicate with the web server 1142. As one example, the trading device 1110 may run a web browser, referred to in this disclosure as a browser, which establishes a browsing session with the web server 1142. This may occur after appropriate domain name resolution to an IP address of the cloud services 1140 and/or after appropriate authentication of the trading device 1110 (or user thereof) with the cloud services 1140. The browser sends requests to the web server 1142, and the web server 1142 provides responses to the browser, for example using the HyperText Transfer Protocol (HTTP) or the Secure HyperText Transfer Protocol (HTTPS) protocol. The web server 1142 may provide a user interface to the browser, via which a user can interact with the electronic trading platform. The user interface may allow market data to be displayed and/or allow trade orders to be placed. As another example, the trading device 1110 may run an application which communicates with the web server 1142, such as via an application programming interface (API), to allow a user to interact with the electronic trading platform. The application may provide a user interface via which a user can interact with the electronic trading platform.

The trading device 1110 may communicate with the PDS 1144. The PDS 1144 interfaces with the Product DB 1143. The Product DB 1143 stores definitions of instruments and permissions of users with respect to the instruments. Specifically, the Product DB 1143 stores definitions of tradeable objects, as well as permissions of users to place trade orders with respect to tradeable objects. This information may be provided to the trading device 1110. This information may be used by a user interface of the trading device 1110 to determine, for the given user of the trading device 1110, for which tradeable objects trade orders are allowed to be placed.

The trading device 1110 may communicate with the user setup server 1146. The user setup server 1146 interfaces with the user setup database 1145, which stores user's settings, preferences, and other information associated with the user's account. This information may be provided by the trading device 1110 to the user setup server 1146 on user registration, or at certain times after registration, and the user setup server 1146 may store this information in the user setup database 1145. This information may be provided to the trading device 1110. This information may be used by a user interface of the trading device 1110 to determine which market data is to be shown and in which format.

The transaction database 1147 stores information on transactions carried out using the electronic trading system 1100. The transaction database 1147 may store all of the trade orders submitted by users and all of the corresponding order execution reports provided by the exchange 1130 when the trade order is executed. The transaction server 1148 may interrogate the transaction database 1147 to produce an audit trail 1149, for example for a given user. This audit trail 1149 may be provided to the trading device 1110 (or another device) to allow inspection and/or analysis of the trading activity of a given user.

The data center 1160 includes a multicast bus 1161, a price server 1162, an edge server 1163, a risk server 1164, a ledger uploader server 1165, an order connector 1166, and a strategy engine server 1167. The various components within the data center 1160 communicate with one another using the multicast bus 1161. This allows for efficient and scalable communications between the components within the data center 1160. For example, information provided by one of the components may be received by multiple other of the components. Transmitting this information on a multicast bus 1161 to which the other components are subscribed allows for the information to be transmitted in one message, irrespective of how many components may receive the information.

The price server 1162 receives market data from the exchange 1130. The price server 1162 converts this information into a format and/or syntax associated with (for example, used by) the electronic trading system 1100. The price server 1162 transmits the converted information as one or more multicast messages on the multicast bus 1161. Specifically, the price server 1162 multicasts this information on a first multicast bus A, to be received by price clients. The edge server 1163 and the strategy engine server 1167 subscribe to the first multicast bus A and receive the market data from the price server 1162. The price server 1162 may communicate with the cloud services 1140. For example, the price server 1162 may provide information on products or tradeable objects to the PDS server 1144 for the PDS server 1144 to use in defining tradeable objects.

The edge server 1163 communicates with the trading device 1110. For example, the trading device 1110 may communicate with the edge server 1163 over a secure web socket or a TCP connection. In some examples, the edge server 1163 may be implemented as a server cluster. The number of servers in the cluster may be determined and scaled as necessary depending on utilization. The edge server 1163 receives market data over the first multicast bus A and routes the market data to the trading device 1110. A user of the trading device 1110 may decide to place a trade order based on the market data. The edge server 1163 routes trading orders from the trading device 1110 towards the exchange 1130. Specifically, when the edge server 1163 receives an order message from the trading device 1110, the edge server 1163 multicasts the order message (or at least a portion of the contents thereof) on a second multicast bus B, to be received by order clients. The risk server 1164 subscribes to the second multicast bus B and receives the order message from the edge server 1163.

The risk server 1164 is used to determine a pre-trade risk for a given trade order contained in a given order message. For example, for a given trade order, the risk server 1164 may determine whether or not the user placing the trade order is permitted to do so. The risk server 1164 may determine whether the user is permitted to trade the quantity of the tradeable object specified in the trade order. The risk server 1164 may prevent unauthorized trade orders being placed. The risk server 1164 receives the order message from the edge server 1163 over the second multicast bus B and processes the order message to determine a risk for the trade order of the message. If the risk server 1164 determines that the trade order should not be placed (for example, a risk associated with the trade order is over a threshold) the risk server 1164 prevents the trade order from being placed. For example, in this case, the risk server 1164 may not transmit the order message to the order connector 1166 and may instead transmit a message indicating to the user that the trade order was not placed. If the risk server 1164 determines that the trade order should be placed (for example, a risk associated with the trade order is below a threshold) the risk server 1164 forwards the order message to the order connector 1166. Specifically, the risk server 1164 multicasts the order message on the second multicast bus B. The order connector 1166 and the ledger uploader 1165 are subscribed to the second multicast bus B and receive the order message from the risk server 1164.

The ledger uploader server 1165 is in communication with the transaction database 1147 of the cloud services 1140. The ledger uploader server 1165 receives the order message from the risk server 1164 and transmits the order message to the transaction database 1147. The transaction database 1147 then stores the order message (or at least a portion of the contents thereof) in the ledger stored in the transaction database 1147.

The order connector 1166 is in communication with the exchange 1130. The order connector 1166 receives the order message from the risk server 1164, processes the order message for sending to the exchange 1130, and sends the processed order message to the exchange 1130. Specifically, the processing includes processing the order message into a data format understood by the exchange 1130. If the trade order within the order message is executed by the exchange 1130, the exchange 1130 sends a corresponding execution report message to the order connector 1166. The execution report message includes an execution report detailing the execution of the trade order. The order connector 1166 applies processing to the execution report message. Specifically, the processing includes processing the execution report message into a data format understood by the electronic trading system and the trading device 1110. The order connector 1166 multicasts the processed execution report message on a third multicast bus C for receipt by execution report clients. The edge server 1163 and the ledger uploader 1165 are subscribed to the third multicast bus C and receive the processed execution report message. The ledger uploader 1165 communicates with the transaction database 1147 to update the ledger with the execution report message (or at least a portion of the contents thereof). The edge server 1163 forwards the execution report message to the trading device 1110. The trading device 1110 may display information based on the execution report message to indicate that the trade order has been executed.

In some examples, order messages may be submitted by the strategy engine server 1167. For example, the strategy engine server 1167 may implement one or more strategy engines using an algorithmic strategy engine and/or an autospreader strategy engine. The strategy engine 1167 may receive market data (from the price server 1162 via the first multicast bus A) and automatically generate order messages on the basis of the market data and a suitably configured algorithm. The strategy engine server 1167 may transmit an order message to the order connector 1166 (via the risk server 1164 and the second multicast bus B), and the order connector 1166 processes the order message in the same way as described above. Similarly, when the exchange 1130 executes the order, the strategy engine 1167 may receive (via the third multicast bus C) a corresponding order execution report message from the order connector 1166. The order message and the execution report message may be transmitted to the ledger uploader 1165 in a similar way to as described above, in order for the ledger uploader 1165 to update the ledger stored by the transaction database 1147.

In some examples, the trade orders sent by the trading device 1110 may not be submitted by a person. For example, the trading device 1110 may be a computing device implementing an algorithmic trading application. In these examples, the trading device 1110 may not communicate with the web server 1142, PDS 1144, and/or the user setup server 1146, and may not utilize a browser or a user interface for submitting trades. The application running on the trading device 1110 may communicate with an adapter associated with the edge server 1163. For example, the application and the adapter may communicate with each other using Financial Information Exchange (FIX) messages. In these examples, the adapter may be a FIX adapter. The application running on the trading device 1110 may receive market data in a FIX format (the market data being provided by the price server 1162 and converted into the FIX format by the FIX adapter associated with the edge server 1163). The application running on the trading device 1110 may generate trade orders based on the received market data, and transmit order messages in a FIX format to the FIX adapter associated with the edge server 1163. The FIX adapter associated with the edge server 1163 may process the order messages received in the FIX format into a format understood by the components of the data center 1160.

It is to be understood that the electronic trading system 1100 is merely an example, and other electronic trading systems could be used. As one example, the electronic trading system 1100 need not necessarily include the cloud services 1140. As another example, the data center 1160 may include more or fewer components than described above with reference to FIG. 11. As another example, a form of messaging between components of the data center 1160 other than multicast messaging may be used.

In examples, the price server 1162 may be provided by or include the server system 206 of any of the examples described above with reference to FIG. 1 to FIG. 9. For example, the price server 1162 may be configured to provide the same or similar functionality as the server system 206 according to any of the examples described above with reference to FIG. 1 to FIG. 9. Accordingly, in examples, the server system 206 according to any of the examples described above with reference to FIG. 1 to FIG. 9 may implement the price server 1162 of the example electronic trading system 1100. In examples, the second network 212 according to any of the examples described above with reference to FIG. 1 to FIG. 9 may be provided by the multicast bus 1161 of the data center 1160 of the electronic trading system 1100.

In examples, the price server 1162 may receive multiple data streams. The multiple data streams may be received from a data source (not shown in FIG. 11, for example, a data source 208 according to any one of the examples described above with reference to FIG. 1 to FIG. 9). In examples, the data source 208 may be separate to, for example in addition to, the exchange 1130. In these examples, the data source 208 may represent a server or other computing device that provides data to the price server 1162 in addition to the market data provided by the exchange 1130. For example, the data source 208 may provide price data provided by liquidity providers. For example, different liquidity providers may provide different prices for liquidity. In these examples, the multiple different data streams may include price data provided by respective different liquidity providers or respective different combinations of liquidity providers. The price server 1162 may perform translation and/or conversion of the data of the multiple different data streams before the price server 1162 multicasts this data over the multicast bus 1161. For example, the data source 208 may provide the data streams using the FIX protocol, whereas the price server 1162 may multicast data using a proprietary protocol. The price server 1162 may therefore be configured to translate the multiple received data streams from a format understood and used by the data source 208 into a format understood and used by the price clients of the data center 1160.

In examples, one or more components of the data center 1160 may be provided by a client device 202a, 202b, or more generally a client, according to any of the examples described above with reference to FIG. 1 to FIG. 9. Accordingly, in examples, one or more of the components of the data center 1160 may be a price client of the price server 1162.

As one example, the reference '1163' in FIG. 11 may generally refer to a computing device or system (such as computing device 100 of FIG. 1) configured with software that enables the computing device 1163 to function as an edge server (for example as described above), and configured with software that enables the computing device 1163 to function as a price client. For example, the computing device 1163 may run a client according to any one of the examples described above with reference to FIG. 1 to FIG. 9. For example, the client may be associated with the trading device 1100 (or user thereof). For example, when the trading device 1100 connects to the computing device 1163, the computing device 1163 may establish the client on behalf of the trading device (or user thereof). The client may store an identifier indicating a data stream from the data source 208 associated with the client, for example associated with the trading device 1100 (or user thereof) on behalf of which the client is established. The price server 1162 may multicast data to the client running on the computing device 1163, using the multicast bus 1161 as described above. The price server 1162 may multicast data of a data stream received from the data source 208 (or a translated version thereof) to the client running on the computing device 1163 in accordance with a mapping, for example as described above for the server system 206 with reference to FIG. 1 to FIG. 9. The client running on the computing device 1163 may match the stored identifier with an identifier in the mapping and obtain data of the multicast stream mapped to the matched identifier in the mapping, for example as described above with reference o FIG. 1 to FIG. 9. The client running on the computing device 1163 may therefore obtain data of a data stream associated with the client, for example associated with the trading device 1100 (or user thereof) on behalf of which the client is established. Accordingly, the computing device 1163 may function as a price client of the price server 1163.

The computing device 1163 may provide the data obtained by the client on behalf of the trading device 1100 to the trading device 1100. For example, the computing device 1163 may run software to provide edge server functionality to the trading device 1100. For example, the server software may obtain the data from the client running on the computing device 1163. The server software running on the computing device 1163 may perform protocol translation on the multicast stream data received by the client into a format that is understood by the trading device 1110. The server software running on the computing device 1163 may then transmit the (translated) data to the trading device 1100 on whose behalf the client was established, over the connection to the trading device 1100. For example, this may be transmitted over the second network 1172, for example over a TCP, web socket or FIX connection. The trading device 1100 may then use the data to inform a trading decision. For example, the trading decision may be implemented as an order message sent to the exchange 1130 via the data center 1160, for example as described above. For example, the order message may be sent to the server software running on the computing device 1163, which may perform protocol translation of the order message into a format that is understood by the data center 1160, and transmit the (translated) order message on the multicast bus 1161, for example as described above. Accordingly, the computing device 1163 may function as an edge server to the trading device 1100. In examples, the server software running on the computing device 1163 may provide a front-end application for the trading device 1100. The front-end application may provide data (such as price data) to the trading device 1100 and may receive data (such as trade orders) from the trading device 1100 (or a user thereof).

In examples, the computing device 1163 (or one or more of a cluster of computing devices 1163) may run multiple clients. For example, each client may be associated with a respective one of multiple trading devices 1100 (or a user thereof). Each client of the computing device(s) 1163 may be configured to provide the same or similar functionality as a client 202a, 202b according to any of the examples described above with reference to FIG. 1 to FIG. 9. The price server 1162 may multicast data to the clients running on the computing device(s) 1163, using the multicast bus 1161 as described above. The price server 1162 may multicast data of the multiple data streams received from the data source 208 (or a translated version thereof) to the clients running on the computing device(s) 1163 in accordance with a mapping, for example as described above for the server system 206 with reference to FIG. 1 to FIG. 9. The computing device(s) 1163 (or more specifically, server software running thereon) may, for each client, obtain the data from the client, translate the data into a format understood by the trading device 1100 with which the client is associated, and transmit the (translated) data to the trading device 1110 with which the client is associated over the respective connection (such as TCP, web socket, or FIX connection) with the trading device 1110. By multicasting data of multiple different received data streams so that different clients running on the computing device(s) 1163 can obtain different data (as described above with reference to FIG. 1 to FIG. 9), the price server 1162 may provide for efficient, scalable and tailored messaging.

As another example, the strategy engine 1167 may be configured to provide the same or similar functionality as a client device 202a, 202b, or more generally a client, according to any of the examples described above with reference to FIG. 1 to FIG. 9. For example, the strategy engine 1167 may include a client as described above with reference to FIG. 1 to FIG. 9. In examples, the data center 1160 may include multiple such strategy engines 1167 (not shown in FIG. 11) for example each associated with a different user account. The price server 1162 may multicast data to the client(s) of the strategy engine(s) 1167, using the multicast bus 1161 as described above. The price server 1162 may multicast data of the multiple data streams received from the data source 208 (or a translated version thereof) to the client(s) of the strategy engine(s) 1167 in accordance with a mapping, for example as described above for the server system 206 with reference to FIG. 1 to FIG. 9. By multicasting data of multiple different received data streams so that clients of different strategy engines 1167 can obtain different data (as described above with reference to FIG. 1 to FIG. 9), the price server 1162 may provide for efficient, scalable and tailored messaging. In examples, for each strategy engine 1167, the client associated with the strategy engine 1167 may provide the obtained data to the strategy engine 1167, and the strategy engine 1167 may use the data of the associated data stream from the data source 208 to inform a trading decision. For example, the trading decision may be implemented as an order message sent to the exchange 1130 via the order connector 1166, for example as described above.

Other components of the data center 1160, such as other back-end applications (not shown), which may need to obtain data of a particular one of the data streams (for example because they are associated with a particular user account) may be configured to provide the same or similar functionality as a client device 202a, 202b, or more generally a client, according to any of the examples described above with reference to FIG. 1 to FIG. 9. For example, each component may run, include, or otherwise be associated with a client as described above with reference to FIG. 1 to FIG. 9. For example, the client of each component may be provided with and store the identifier indicating the particular data stream, and hence obtain data from the appropriate multicast stream multicast by the price server 1162 on the multicast bus 1161, for example as described above.

In examples, the user setup server 1146 may be provided by an ID server 204 according to any of the examples described above with reference to FIG. 1 to FIG. 9. For example, the user setup server 1146 may be configured to provide the same or similar functionality as the ID server 204 according to any of the examples described above with reference to FIG. 1 to FIG. 9. For example, each trading device 1110 and/or strategy engine 1167 (or user thereof) may provide their respective connection information for connecting to the data source 208 to the user setup server 1146. For example, this may be provided on registration or set up of the trading device 1110 and/or strategy engine 1167 with the trading platform provided by the hybrid cloud system 1120, and/or from time-to-time thereafter. In examples, the user set-up server 1146 may associate the connection information for each different trading device 1110 and/or strategy engine 1167 (or user thereof) with an identifier. The user set-up server 1146 may provide the connection information for each trading device 1110 and/or strategy engine 1167 (or user thereof) in association with the identifier associated with connection information to the price server 1162. As a result, the price server 1162 may use the connection information to establish a connection with the data source 208 for each trading device 1110 and/or strategy engine 1167 (or user thereof) and accordingly receive the multiple data streams and determine the identifier for each received data stream. The user set-up server 1146 may also provide, to the client associated with each trading device 1110 and/or strategy engine 1167, the identifier associated with the connection information from the trading device 1110 and/or strategy engine 1167 (or user thereof). As a result, the client associated with each trading device 1110 and/or strategy engine 1167 may store the identifier indicating a data stream associated with the trading device 1110 and/or strategy engine 1167.

In examples, the PDS server 1144 may be provided by an ID server 204 according to any of the examples described above with reference to FIG. 1 to FIG. 9. For example, the PDS server 1144 may be configured to provide the same or similar functionality as the ID server 204 according to any of the examples described above with reference to FIG. 1 to FIG. 9. In examples, the PDS server 1144 may define a new instrument for each respective data stream. For example, the trading device 1110 and/or strategy engine 1167 (or user thereof) may provide, to the PDS server 1144, connection information for establishing a connection with the data source 208 to receive the certain data stream. The PDS server 1144 may define a new instrument for the connection information for each different trading device 1110 and/or strategy engine 1167 (or user thereof). Each new instrument definition may itself be an identifier for the associated data stream. The PDS server 1144 may provide, to the price server 1162, the connection information for each trading device 1110 and/or strategy engine 1167 in association with the instrument definition associated with connection information. As a result, the price server 1162 may use the connection information to establish a connection with the data source 208 for each trading device 1110 and/or strategy engine 1167 and accordingly receive the multiple data streams and determine the identifier (in this case, the instrument definition) for each received data stream.

In examples, PDS server 1144 may store permissions of the client associated with each trading device 1110 and/or strategy engine 1167 (or a user thereof) to obtain data from a certain data stream, for example received over a certain connection. That is, the PDS server 1144 may store permissions of the client associated with each trading device 1110 and/or strategy engine 1167 (or a user thereof) to access data of certain instruments defined by the PDS server 1144. For example, these permissions may be established on registration or set-up of the trading device 1110 and/or strategy engine 1167 (or a user thereof) with a platform provided by the hybrid cloud system 1120 and/or from time-to-time thereafter. For example, permission for a particular instrument may be established by the trading device 1110 and/or strategy engine 1167 providing the connection information for establishing a connection with the data source 208 to receive a data stream on the basis of which the instrument is defined.

The PDS server 1144 may store, for each trading device 1110 and/or strategy engine 1167 (or user thereof) identity information of the trading device 1110 and/or strategy engine 1167 (or a user thereof) such as a user ID or device ID, in association with the one or more instruments defined for the respective one or more data streams that the client associated with the trading device 1110 and/or strategy engine 1167 (or user thereof) is permissioned to obtain data from. An API of the client associated with each trading device 1110 and/or strategy engine 1167 may communicate with the PDS server 1144. For example, the API may provide identity information for the trading device 1110 and/or strategy engine 1167 (or user thereof) to the PDS server 1144. The PDS server 1144 may use the provided identity information to determine the one or more instruments the client associated with the trading device 1110 and/or strategy engine 1167 (or user thereof) is permissioned to obtain data in respect of. The PDS server 1144 may then provide the determined one or more instrument definitions (that is, identifiers) to the API, and the API may store the one or more instrument definition (that is, identifiers) at the client associated with the trading device 1110 and/or strategy engine 1167. As a result, the client associated with each trading device 1110 and/or strategy engine 1167 may store an instrument definition (that is, identifier) indicating a data stream associated with the trading device 1110 and/or strategy engine 1167. That is, the client associated with each trading device 1110 and/or strategy engine 1167 may store an instrument definition (that is, identifier) indicating a data stream that the client associated with the trading device 1110 and/or strategy engine 1167 is permissioned by the PDS server 1144 to obtain data from. This permissions-based approach may allow for centralized control over the data streams that each the trading device 1110 and/or strategy engine 1167 can obtain data from.

As used herein, the phrases "configured to" and "adapted to" encompass that an element, structure, or device has been modified, arranged, changed, or varied to perform a specific function or for a specific purpose.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example. The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made, and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

CLAUSES

1. A server system including: a memory; and at least one processor configured to multicast data to a plurality of clients, each client storing an identifier indicating a data stream associated with the client, wherein the at least one processor is further configured to: receive a plurality of the data streams, each of the data streams including data; determine the identifier for each of the plurality of received data streams; transmit, to the plurality of clients, a mapping between each identifier and a respective multicast stream; and multicast data of the plurality of received data streams in accordance with the mapping.
2. The server system of clause 1, wherein the mapping includes a mapping between each identifier and a respective different multicast address of a multicast stream, and wherein the at least one processor is configured to: for each received data stream, multicast data of the received data stream using the multicast address mapped to the identifier determined for the data stream.
3. The server system of clause 1 or clause 2, wherein the at least one processor is configured to: broadcast the mapping over a network to which each of the plurality of clients are connected.
4. The server system of any one of clause 1 to clause 3, wherein the at least one processor is configured to: for each of the received data streams, generate a multicast stream including the identifier for the received data stream and data of the received data stream, thereby to encode the mapping into each multicast stream; and multicast each of the generated multicast streams to the plurality of clients.
5. The server system of clause 4, wherein each multicast stream includes one or more multicast packets each including a header and a payload, and wherein, for each of the generated multicast streams, the header includes the identifier for the received data stream and the payload includes data of the received data stream.
6. The server system of clause 4 or 5, wherein each of the generated multicast streams is multicast using the same multicast address.
7. The server system of any one of clause 1 to clause 6, wherein the at least one processor is configured to: normalize the data of each of the plurality of the received streams that is to be multicast.
8. The server system of any one of clause 1 to clause 7, wherein the at least one processor is configured to: receive the plurality of data streams over a respective plurality of different connections, wherein, for each of the received data streams, the identifier for the received data stream is determined based on the connection over which the data stream is received.
9. The server system of any one of clause 1 to clause 8, wherein the at least one processor is configured to: receive the identifiers each in association with respective connection information for establishing a connection over which a respective one of the data streams is received; and for each of the plurality of received data streams, determine the identifier associated with the connection information of the connection over which the data stream is received as the identifier for the data stream.
10. The server system of any one of clause 1 to clause 9, wherein each data stream is associated with a particular client, and the server system includes: a server configured to: obtain the connection information for each client; associate the connection information for each different client with a different one of the identifiers; provide, to the at least one processor, for each client, the identifier in association with the connection information for the client; and provide, to each client, the identifier associated with the connection information for the client.
11. The server system of any one of clause 1 to clause 10, wherein the at least one processor is configured to: for each of the plurality of data streams: receive connection information for establishing a connection to a data source from which the data stream is to be received; establish, using the connection information, the connection; and receive the data stream over the connection.
12. The server system of clause 11, wherein each data stream is associated with a particular client, and wherein, for each data stream, the connection information includes log-in information for the client associated with the data stream to access the data source.
13. The server system of any one of clause 1 to clause 12, wherein the server system implements a price server of an electronic trading system.
14. The server system of any one of clause 1 to clause 13, wherein the server system includes a data source configured to provide the plurality of data streams to the at least one processor, and wherein the plurality of different data streams include price data provided by respective different liquidity providers or respective different combinations of liquidity providers.
15. A method of multicasting data to a plurality of clients, each client storing an identifier indicating a data stream associated with the client, the method comprising, by a server system: receiving a plurality of the data streams, each of the data streams including data; determining the identifier for each of the plurality of received data streams; transmitting, to the plurality of clients, a mapping between each identifier and a respective multicast stream; and multicasting data of the plurality of received data streams in accordance with the mapping.
16. The method of clause 15, wherein the mapping includes a mapping between each identifier and a respective different multicast address of a multicast stream, and wherein the method comprises, by the server system: for each received data stream, multicasting data of the received data stream using the multicast address mapped to the identifier determined for the data stream.
17. The method of clause 15 or clause 16, wherein the method comprises, by the server system: broadcasting the mapping over a network to which each of the plurality of clients are connected.
18. The method of any one of clause 15 to clause 17, wherein the method comprises, by the server system: for each of the received data streams, generating a multicast stream including the identifier for the received data stream and data of the received data stream, thereby to encode the mapping into each multicast stream; and multicasting each of the generated multicast streams to the plurality of clients.
19. The method of clause 18, wherein each multicast stream includes one or more multicast packets each including a header and a payload, and wherein, for each of the generated multicast streams, the header includes the identifier for the received data stream and the payload includes data of the received data stream.
20. The method of clause 18 or 19, wherein each of the generated multicast streams is multicast using the same multicast address.
21. The method of any one of clause 15 to clause 20, wherein the method comprises, by the server system: normalizing the data of each of the plurality of the received streams that is to be multicast.
22. The method of any one of clause 15 to clause 21, wherein the method comprises, by the server system: receiving the plurality of data streams over a respective plurality of different connections, wherein, for each of the received data streams, the identifier for the received data stream is determined based on the connection over which the data stream is received.
23. The method of any one of clause 15 to clause 22, wherein the method comprises, by the server system: receiving the identifiers each in association with respective connection information for establishing a connection over which a respective one of the data streams is received; and for each of the plurality of received data streams, determining the identifier associated with the connection information of the connection over which the data stream is received as the identifier for the data stream.

24. The method of any one of clause 15 to clause 23, wherein each data stream is associated with a particular client, and the method comprises: by a server: obtaining the connection information for each client; associating the connection information for each different client with a different one of the identifiers; providing, to the server system, for each client, the identifier in association with the connection information for the client; and providing, to each client, the identifier associated with the connection information for the client.

25. The method of any one of clause 15 to clause 14, wherein the method comprises, by the server system: for each of the plurality of data streams: receiving connection information for establishing a connection to a data source from which the data stream is to be received; establishing, using the connection information, the connection; and receiving the data stream over the connection.

26. The method of clause 25, wherein each data stream is associated with a particular client, and wherein, for each data stream, the connection information includes log-in information for the client associated with the data stream to access the data source.

27. The method of any one of clause 15 to clause 26, wherein the server system implements a price server of an electronic trading system.

28. The method of any one of clause 15 to clause 27, wherein the plurality of data streams are received by the server system from a data source, and wherein the plurality of different data streams include price data provided by respective different liquidity providers or respective different combinations of liquidity providers.

29. A tangible computer readable medium comprising instructions which, when executed, cause at least one processor of a server system to perform functions, the at least one processor being configured to multicast data to a plurality of clients, each client storing an identifier indicating a data stream associated with the client, the functions including at least: receiving a plurality of the data streams, each of the data streams including data; determining the identifier for each of the plurality of received data streams; transmitting, to the plurality of clients, a mapping between each identifier and a respective multicast stream; and multicasting data of the plurality of received data streams in accordance with the mapping.

30. The tangible computer readable medium of clause 29, wherein the mapping includes a mapping between each identifier and a respective different multicast address of a multicast stream, and wherein the functions further include: for each received data stream, multicasting data of the received data stream using the multicast address mapped to the identifier determined for the data stream.

31. The tangible computer readable medium of clause 29 or clause 30, wherein the functions further include: broadcasting the mapping over a network to which each of the plurality of clients are connected.

32. The tangible computer readable medium of any one of clause 29 to clause 31, wherein the functions further include: for each of the received data streams, generating a multicast stream including the identifier for the received data stream and data of the received data stream, thereby to encode the mapping into each multicast stream; and multicasting each of the generated multicast streams to the plurality of clients.

33. The tangible computer readable medium of clause 32, wherein each multicast stream includes one or more multicast packets each including a header and a payload, and wherein, for each of the generated multicast streams, the header includes the identifier for the received data stream and the payload includes data of the received data stream.

34. The tangible computer readable medium of clause 32 or 33, wherein each of the generated multicast streams is multicast using the same multicast address.

35. The tangible computer readable medium of any one of clause 29 to clause 34, wherein the functions further include: normalizing the data of each of the plurality of the received streams that is to be multicast.

36. The tangible computer readable medium of any one of clause 29 to clause 35, wherein the functions further include: receiving the plurality of data streams over a respective plurality of different connections, wherein, for each of the received data streams, the identifier for the received data stream is determined based on the connection over which the data stream is received.

37. The tangible computer readable medium of any one of clause 29 to clause 36, wherein the functions further include: receiving the identifiers each in association with respective connection information for establishing a connection over which a respective one of the data streams is received; and for each of the plurality of received data streams, determining the identifier associated with the connection information of the connection over which the data stream is received as the identifier for the data stream.

38. The tangible computer readable medium of any one of clause 29 to clause 37, wherein each data stream is associated with a particular client, and wherein the instructions, when executed, cause at least one processor of a server of the server system to perform functions including at least: obtaining the connection information for each client; associating the connection information for each different client with a different one of the identifiers; providing, to the at least one processor of the server system, for each client, the identifier in association with the connection information for the client; and providing, to each client, the identifier associated with the connection information for the client.

39. The tangible computer readable medium of any one of clause 29 to clause 38, wherein the functions further include: for each of the plurality of data streams: receiving connection information for establishing a connection to a data source from which the data stream is to be received; establishing, using the connection information, the connection; and receiving the data stream over the connection.

40. The tangible computer readable medium of clause 39, wherein each data stream is associated with a particular client, and wherein, for each data stream, the connection information includes log-in information for the client associated with the data stream to access the data source.

41. The tangible computer readable medium of any one of clause 29 to clause 40, wherein the server system implements a price server of an electronic trading system.
42. The tangible computer readable medium of any one of clause 29 to clause 41, wherein the plurality of data streams are received by the server system from a data source, and wherein the plurality of different data streams include price data provided by respective different liquidity providers or respective different combinations of liquidity providers.
43. A server system including: a memory; and at least one processor configured to multicast data to a plurality of clients, each client storing an identifier indicating a data stream associated with the client, wherein the at least one processor is further configured to: receive a plurality of the data streams, each of the data streams including data; determine the identifier for each of the plurality of received data streams; generate a mapping between each identifier and a respective different multicast address; broadcast the mapping to the plurality of clients; for each received data stream, multicast data of the received data stream using the multicast address mapped to the identifier determined for the received data stream.
44. The server system of clause 43, wherein the at least one processor is configured to: normalize the data of each of the plurality of the received streams that is to be multicast.
45. The server system of clause 43 or clause 44, wherein the at least one processor is configured to: receive the plurality of data streams over a respective plurality of different connections, wherein, for each of the received data streams, the identifier for the received data stream is determined based on the connection over which the data stream is received.
46. The server system of any one of clause 43 to clause 45, wherein the at least one processor is configured to: receive the identifiers each in association with respective connection information for establishing a connection over which a respective one of the data streams is received; and for each of the plurality of received data streams, determine the identifier associated with the connection information of the connection over which the data stream is received as the identifier for the data stream.
47. The server system of any one of clause 43 to clause 46, wherein each data stream is associated with a particular client, and the server system includes: a server configured to: obtain the connection information for each client; associate the connection information for each different client with a different one of the identifiers; provide, to the at least one processor, for each client, the identifier in association with the connection information for the client; and provide, to each client, the identifier associated with the connection information for the client.
48. The server system of any one of clause 43 to clause 47, wherein the at least one processor is configured to: for each of the plurality of data streams: receive connection information for establishing a connection to a data source from which the data stream is to be received; establish, using the connection information, the connection; and receive the data stream over the connection.
49. The server system of clause 48, wherein each data stream is associated with a particular client, and wherein, for each data stream, the connection information includes log-in information for the client associated with the data stream to access the data source.
50. The server system of any one of clause 43 to clause 49, wherein the server system implements a price server of an electronic trading system.
51. The server system of any one of clause 43 to clause 50, wherein the server system includes a data source configured to provide the plurality of data streams to the at least one processor, and wherein the plurality of different data streams include price data provided by respective different liquidity providers or respective different combinations of liquidity providers.
52. A method of multicasting data to a plurality of clients, each client storing an identifier indicating a data stream associated with the client, wherein the method comprises, by a server system: receiving a plurality of the data streams, each of the data streams including data; determining the identifier for each of the plurality of received data streams; generating a mapping between each identifier and a respective different multicast address; broadcasting the mapping to the plurality of clients; for each received data stream, multicasting data of the received data stream using the multicast address mapped to the identifier determined for the received data stream.
53. A tangible computer readable medium comprising instructions which, when executed, cause at least one processor of a server system to perform functions, the at least one processor being configured to multicast data to a plurality of clients, each client storing an identifier indicating a data stream associated with the client, the functions including at least: receiving a plurality of the data streams, each of the data streams including data; determining the identifier for each of the plurality of received data streams; generating a mapping between each identifier and a respective different multicast address; broadcasting the mapping to the plurality of clients; for each received data stream, multicasting data of the received data stream using the multicast address mapped to the identifier determined for the received data stream.
54. A server system including: a memory; and at least one processor configured to multicast data to a plurality of clients, each client storing an identifier indicating a data stream associated with the client, wherein the at least one processor is further configured to: receive a plurality of the data streams, each of the data streams including data; determine the identifier for each of the plurality of received data streams; for each of the received data streams, generate a multicast stream including the identifier for the received data stream and data of the received data stream; and multicast the generated multicast streams to the plurality of clients.
55. The server system of clause 54, wherein each multicast stream includes one or more multicast packets each including a header and a payload, and wherein, for each of the generated multicast streams, the header includes the identifier for the received data stream and the payload includes data of the received data stream.
56. The server system of clause 54 or clause 55, wherein each of the generated multicast streams is multicast using the same multicast address.
57. The server system of any one of clause 54 to clause 56, wherein the at least one processor is configured to: normalize the data of each of the plurality of the received streams that is to be multicast.

58. The server system of any one of clause 54 to clause 57, wherein the at least one processor is configured to: receive the plurality of data streams over a respective plurality of different connections, wherein, for each of the received data streams, the identifier for the received data stream is determined based on the connection over which the data stream is received.

59. The server system of any one of clause 54 to clause 58, wherein the at least one processor is configured to: receive the identifiers each in association with respective connection information for establishing a connection over which a respective one of the data streams is received; and for each of the plurality of received data streams, determine the identifier associated with the connection information of the connection over which the data stream is received as the identifier for the data stream.

60. The server system of any one of clause 54 to clause 59, wherein each data stream is associated with a particular client, and the server system includes: a server configured to: obtain the connection information for each client; associate the connection information for each different client with a different one of the identifiers; provide, to the at least one processor, for each client, the identifier in association with the connection information for the client; and provide, to each client, the identifier associated with the connection information for the client.

61. The server system of any one of clause 54 to clause 60, wherein the at least one processor is configured to: for each of the plurality of data streams: receive connection information for establishing a connection to a data source from which the data stream is to be received; establish, using the connection information, the connection; and receive the data stream over the connection.

62. The server system of clause 61, wherein each data stream is associated with a particular client, and wherein, for each data stream, the connection information includes log-in information for the client associated with the data stream to access the data source.

63. The server system of any one of clause 54 to clause 62, wherein the server system implements a price server of an electronic trading system.

64. The server system of any one of clause 54 to clause 63, wherein the server system includes a data source configured to provide the plurality of data streams to the at least one processor, and wherein the plurality of different data streams include price data provided by respective different liquidity providers or respective different combinations of liquidity providers.

65. A method of multicasting data to a plurality of clients, each client storing an identifier indicating a data stream associated with the client, wherein the method comprises, by a server system: receiving a plurality of the data streams, each of the data streams including data; determining the identifier for each of the plurality of received data streams; for each of the received data streams, generating a multicast stream including the identifier for the received data stream and data of the received data stream; and multicasting the generated multicast streams to the plurality of clients.

66. A tangible computer readable medium comprising instructions which, when executed, cause at least one processor of a server system to perform functions, the at least one processor being configured to multicast data to a plurality of clients, each client storing an identifier indicating a data stream associated with the client, the functions including at least: receiving a plurality of the data streams, each of the data streams including data; determining the identifier for each of the plurality of received data streams; for each of the received data streams, generating a multicast stream including the identifier for the received data stream and data of the received data stream; and multicasting the generated multicast streams to the plurality of clients.

67. A client system including: a memory storing an identifier indicating a data stream associated with the client system; and at least one processor configured to: receive, from a server system, a mapping between a plurality of identifiers and a respective plurality of multicast streams; match the stored identifier with an identifier in the mapping; and obtain data of the multicast stream mapped to the matched identifier in the mapping.

68. The client system of clause 67, wherein the mapping includes a mapping between the plurality of identifiers and a respective plurality of different multicast addresses, and wherein the at least one processor is further configured to: configure a communications interface of the client system to receive data transmitted with a destination address corresponding to the multicast address mapped to the matched identifier in the mapping.

69. The client system of clause 67, wherein the mapping is provided by including each identifier in a respective different one of a plurality of multicast streams, and wherein the at least one processor is further configured to: receive the plurality of multicast streams; and obtain data from a multicast stream, of the plurality of multicast streams, that includes the identifier matched to the stored identifier.

70. A method comprising, by a client system storing an identifier indicating a data stream associated with the client system: receiving, from a server system, a mapping between a plurality of identifiers and a respective plurality of multicast streams; matching the stored identifier with an identifier in the mapping; and obtaining data of the multicast stream mapped to the matched identifier in the mapping.

71. The method of clause 70, wherein the mapping includes a mapping between the plurality of identifiers and a respective plurality of different multicast addresses, and wherein the method includes, by the client system: configuring a communications interface of the client system to receive data transmitted with a destination address corresponding to the multicast address mapped to the matched identifier in the mapping.

72. The method of clause 70, wherein the mapping is provided by including each identifier in a respective different one of a plurality of multicast streams, and wherein the method comprises, by the client system: receiving the plurality of multicast streams; and obtaining data from a multicast stream, of the plurality of multicast streams, that includes the identifier matched to the stored identifier.

73. A tangible computer readable medium comprising instructions which, when executed, cause at least one processor of a client system to perform functions, the client system storing an identifier indicating a data stream associated with the client system, the functions including at least: receiving, from a server system, a mapping between a plurality of identifiers and a respective plurality of multicast streams; matching the stored identifier with an identifier in the mapping; and obtaining data of the multicast stream mapped to the matched identifier in the mapping.

74. The tangible computer readable medium of clause 73, wherein the mapping includes a mapping between the plurality of identifiers and a respective plurality of different multicast addresses, and wherein the functions include: configuring a communications interface of the client system to receive data transmitted with a destination address corresponding to the multicast address mapped to the matched identifier in the mapping.

75. The tangible computer readable medium of clause 73, wherein the mapping is provided by including each identifier in a respective different one of a plurality of multicast streams, and wherein the functions include: receiving the plurality of multicast streams; and obtaining data from a multicast stream, of the plurality of multicast streams, that includes the identifier matched to the stored identifier.

76. A system comprising the server system according to any one of clause 1 to clause 14, and the client system according to any one of clause 67 to clause 69.

73. A method comprising the method according to any of clause 15 to clause 28, and the method according to any one of clause 70 to 72.

The invention claimed is:

1. A server system including:
a permission server in communication with a plurality of clients, wherein the permission server utilizes client device information provided by the plurality of clients to determine an identifier corresponding to at least one data stream of a plurality of data streams for each of the plurality of clients;
a memory; and
at least one processor configured to multicast data to the plurality of clients, each client storing the identifier provided by the permission server and corresponding to at least one data stream of the plurality of data streams associated with the client,
wherein the at least one processor is further configured to:
receive the plurality of the data streams, each of the data streams including data;
determine the identifier corresponding to at least one of the plurality of received data streams;
transmit, to the plurality of clients, a mapping between each identifier and a respective multicast stream; and
multicast data of the plurality of received data streams in accordance with the mapping.

2. The server system of claim 1, wherein the mapping includes a mapping between each identifier and a respective different multicast address of a multicast stream, and wherein the at least one processor is configured to:
for each received data stream, multicast data of the received data stream using the multicast address mapped to the identifier determined for the data stream.

3. The server system of claim 2, wherein the at least one processor is configured to:
broadcast the mapping over a network to which each of the plurality of clients are connected.

4. The server system of claim 1, wherein the at least one processor is configured to:
for each of the received data streams, generate a multicast stream including the identifier for the received data stream and data of the received data stream, thereby to encode the mapping into each multicast stream; and multicast each of the generated multicast streams to the plurality of clients.

5. The server system of claim 4, wherein each multicast stream includes one or more multicast packets each including a header and a payload, and wherein, for each of the generated multicast streams, the header includes the identifier for the received data stream and the payload includes data of the received data stream.

6. The server system of claim 4, wherein each of the generated multicast streams is multicast using the same multicast address.

7. The server system of claim 1, wherein the at least one processor is configured to:
normalise the data of each of the plurality of the received streams that is to be multicast.

8. The server system of claim 1, wherein the at least one processor is configured to:
receive the plurality of data streams over a respective plurality of different connections,
wherein, for each of the received data streams, the identifier for the received data stream is determined based on the connection over which the data stream is received.

9. The server system of claim 1, wherein the at least one processor is configured to:
receive the identifiers each in association with respective connection information for establishing a connection over which a respective one of the data streams is received; and
for each of the plurality of received data streams, determine the identifier associated with the connection information of the connection over which the data stream is received as the identifier for the data stream.

10. The server system of claim 9, wherein each data stream is associated with a particular client, and the server system includes:
a server configured to:
obtain the connection information for each client;
associate the connection information for each different client with a different one of the identifiers;
provide, to the at least one processor, for each client, the identifier in association with the connection information for the client; and
provide, to each client, the identifier associated with the connection information for the client.

11. The server system of claim 1, wherein the at least one processor is configured to:
for each of the plurality of data streams:
receive connection information for establishing a connection to a data source from which the data stream is to be received;
establish, using the connection information, the connection; and
receive the data stream over the connection.

12. The server system of claim 11, wherein each data stream is associated with a particular client, and wherein, for each data stream, the connection information includes log-in information for the client associated with the data stream to access the data source.

13. The server system of claim 1, wherein the server system implements a price server of an electronic trading system.

14. The server system of claim 13, wherein the server system includes a data source configured to provide the plurality of data streams to the at least one processor, and wherein the plurality of different data streams include price data provided by respective different liquidity providers or respective different combinations of liquidity providers.

* * * * *